US007834107B2

(12) United States Patent
Köppl et al.

(10) Patent No.: US 7,834,107 B2
(45) Date of Patent: Nov. 16, 2010

(54) PREPARATION OF POLYOLEFINS HAVING HIGH MOLECULAR WEIGHTS IN THE PRESENCE OF AN ORGANIC TRANSITION METAL COMPOUND IN A GAS-PHASE FLUIDIZED-BED REACTOR

(75) Inventors: Alexander Köppl, Limburgerhof (DE); Rainer Karer, Kaiserslautern (DE); Ulrich Nieken, Neustadt an der Weinstrasse (DE)

(73) Assignee: Basell Polyolefine GmbH, Wesseling (DE)

( * ) Notice: Subject to any disclaimer, the term of this patent is extended or adjusted under 35 U.S.C. 154(b) by 1292 days.

(21) Appl. No.: 10/551,676

(22) PCT Filed: Apr. 1, 2004

(86) PCT No.: PCT/EP2004/003452

§ 371 (c)(1),
(2), (4) Date: Sep. 29, 2005

(87) PCT Pub. No.: WO2004/087776

PCT Pub. Date: Oct. 14, 2004

(65) Prior Publication Data

US 2006/0149003 A1 Jul. 6, 2006

Related U.S. Application Data

(60) Provisional application No. 60/469,192, filed on May 9, 2003.

(30) Foreign Application Priority Data

Apr. 3, 2003 (DE) ................................. 103 15 349

(51) Int. Cl.
*C08F 2/00* (2006.01)
(52) U.S. Cl. .......................... 526/61; 526/901; 526/943; 526/352; 526/73
(58) Field of Classification Search .................. 526/61, 526/73, 901, 352, 943
See application file for complete search history.

(56) References Cited

U.S. PATENT DOCUMENTS

| 4,764,056 | A | 8/1988 | Zentgraf et al. ............... 406/68 |
| 5,077,358 | A | 12/1991 | Durand et al. ............... 526/125 |
| 6,255,418 | B1 | 7/2001 | Jolly et al. .................. 526/160 |
| 6,265,502 | B1* | 7/2001 | Herzog ........................ 526/88 |
| 6,417,302 | B1 | 7/2002 | Bohnen ....................... 526/160 |
| 6,589,905 | B1 | 7/2003 | Fischer et al. ............... 502/300 |
| 6,784,261 | B1 | 8/2004 | Schopf et al. ................. 526/16 |
| 6,812,185 | B2 | 11/2004 | Fischer et al. ............... 502/120 |
| 2003/0236164 | A1 | 12/2003 | Fischer et al. ............... 502/439 |
| 2004/0214970 | A1 | 10/2004 | Schopf et al. ................ 526/159 |
| 2006/0142152 | A1* | 6/2006 | Coalter, III et al. ......... 502/305 |

FOREIGN PATENT DOCUMENTS

| DE | 4241530 | 6/1994 |
| DE | 19710615 | 9/1998 |
| EP | 0089691 | 9/1983 |
| EP | 0226935 | 7/1987 |
| EP | 0475603 | 3/1992 |
| EP | 0571826 | 12/1993 |
| EP | 0692500 | 1/1996 |
| WO | 9109882 | 7/1991 |
| WO | 9600243 | 1/1996 |
| WO | 9736937 | 10/1997 |
| WO | 9822486 | 5/1998 |
| WO | 9840419 | 9/1998 |
| WO | 9900430 | 1/1999 |
| WO | 9903901 | 1/1999 |
| WO | 9906414 | 2/1999 |
| WO | 0005277 | 2/2000 |
| WO | 0024787 | 5/2000 |
| WO | 0031090 | 6/2000 |
| WO | 0109148 | 2/2001 |
| WO | 0141920 | 6/2001 |
| WO | 0250127 | 6/2002 |
| WO | 03022888 | 3/2003 |

OTHER PUBLICATIONS

J. Michl et al., Editor, *Chemical Reviews*, American Chemical Society, Publications Division, vol. 100(4), p. 1167-1681 (2000).
H. Brintzinger et al., "*ansa*-Metallocene derivatives, XVII. Racemic and *meso* diastereomers of group IV metallocene derivatives with symmetrically substituted, dimethylsilanediyl-bridged ligand frameworks. Crystal structure of R,S-Me$_2$Si(3-t-Bu-5-MeC$_5$H$_2$)$_2$ZrCl$_2$," *Journal of Organometallic Chemistry*, vol. 369, p. 359-370 (1989).
M. Brookhart et al., "Highly Active Iron and Cobalt Catalysts for the Polymerization of Ethylene," *J. Am. Chem. Soc.*, vol. 120(16), p. 4049-4050 (1998).
V. C. Gibson et al., "Novel olefin polymerzation catalysts based on iron and cobalt," *Chem. Comm.*, p. 849-850 (1998).

(Continued)

*Primary Examiner*—Robert D. Harlan
(74) *Attorney, Agent, or Firm*—Shao-Hua Guo

(57) ABSTRACT

Process for preparing polyolefins having high molecular weights in the presence of a catalyst comprising an organic transition metal compound in a gas-phase fluidized-bed reactor, where the polyolefins prepared have a melt flow rate at 2.16 kg and 190° C. in accordance with ISO 1133 of less than 4 g/10 min. According to the present invention, a start-up phase during which a polyolefin having an increased melt flow rate of above 4 g/10 min is produced for a transitional period is provided. In this way, trouble-free start-up of the reactor is ensured even in the case of polymer products having a high molecular weight and a melt flow rate below 4 g/10 min and even when using catalysts based on organic transition metal compounds, in particular metallocene catalysts.

16 Claims, No Drawings

OTHER PUBLICATIONS

M. Enders et al., "8-Quinolylcyclopentadienyl, a Ligand with a Tailored Fit for Chelate Complexes," *Chem. Ber.*, vol. 129, p. 459-463 (1996).

P. Jutzi et al., "Cyclopentadienyl compounds wiht nitrogen donors in the side-chain," *Journal of Organometallic Chemistry*, vol. 500, p. 175-185 (1995).

* cited by examiner

PREPARATION OF POLYOLEFINS HAVING HIGH MOLECULAR WEIGHTS IN THE PRESENCE OF AN ORGANIC TRANSITION METAL COMPOUND IN A GAS-PHASE FLUIDIZED-BED REACTOR

CROSS-REFERENCE TO RELATED APPLICATIONS

This application is the U.S. national stage under 35 U.S.C. §371 of International Application PCT/EP2004/003452, filed Apr. 1, 2004, claiming priority to German Patent Application No. 103 15 349.7, filed Apr. 3, 2003 and U.S. Provisional Patent Application No. 60/469,192, filed May 9, 2003; the disclosures of International Application PCT/EP2004/003452, German Patent Application No. 103 15 349.7, and U.S. Provisional Application 60/469,192, each as filed, are incorporated herein by reference.

FIELD OF THE INVENTION

The present invention relates to a process for preparing polyolefins having high molecular weights in the presence of a catalyst comprising an organic transition metal compound in a gas-phase fluidized-bed reactor, where the polyolefins prepared have a melt flow rate at 2.16 kg and 190° C. in accordance with ISO 1133 of less than 4 g/10 min.

BACKGROUND OF THE INVENTION

Gas-phase polymerization processes are economical processes for the polymerization of $C_2$-$C_8$-olefins. Such gas-phase polymerization processes can, in particular, be carried out as gas-phase fluidized-bed processes in which the polymer particles are kept in suspension by a suitable gas stream. Processes of this type are described, for example, in EP-A-0 475 603, EP-A-0 089 691 and EP-A-0 571 826.

During operation of the polymerization reactor, fine particles can be discharged from the reactor by the gas or can fall back into the fluidized bed. However, fine particles also tend to deposit and accumulate on the interior wall of the reactor, particularly in the calming zone known as the freeboard. This can result in formation of deposits which, when they reach a relatively great thickness, become detached and can, for example, block the polymer discharge facility or the distributor plate, while smaller agglomerates are discharged from the reactor together with the product and impair the quality of the latter.

The polymerization reaction is carried out using a catalyst and, if appropriate, a cocatalyst. While the preparation of polyolefins having a relatively high molecular weight and thus a melt flow rate (MFR) at 2.16 kg and 190° C. in accordance with DIN EN ISO 1133 of less than 4 g/10 min is unproblematical in process engineering terms when using Ziegler-Natta catalysts or chromium catalysts, the formation of fine particles presents considerable problems when using catalysts comprising organic transition metal compounds, in particular metallocene catalysts, especially when starting up the reactor. Many of these catalysts, in particular metallocene catalysts based on bis(1-methyl-3-butylcyclopentadienyl) zirkonium dichloride, tend to form fine particles during start-up of the reactor and these accumulate in the calming zone, form deposits and lumps and can hinder the start-up process to such an extent that it has to be terminated.

Various approaches have hitherto been described for improving the start-up behavior and operation of gas-phase fluidized-bed reactors. Thus, WO 99/03901 and EP 692 500 A1 use soundwaves to prevent adhesion of particles, particularly at low heights of the fluidized bed in the reactor.

In WO 99/00430, the gas stream taken off from the reactor is divided into two parts and one part is cooled in a condenser to below the dew point of the gas and fed directly back into the reactor in an amount of at least 10 l per cubic meter of fluidized bed per hour and the other part is conveyed in a bypass around the condenser, passed through a heat exchanger and then fed back into the reactor.

However, all approaches employed hitherto are associated with a relatively great outlay in terms of apparatus and/or give unsatisfactory results when a gas-phase fluidized-bed reactor is operated using catalysts based on organic transition metal compounds.

DESCRIPTION OF THE INVENTION

It is an object of the present invention to overcome the abovementioned disadvantages of the prior art and to provide a process which ensures trouble-free operation of the reactor, in particular during start-up, even when using organic transition metal compounds, in particular metallocenes, as catalysts and when producing products having a high molecular weight and can be carried out simply and inexpensively.

We have found that this object is achieved by a process for preparing polyolefins having a melt flow rate at 2.16 kg and 190° C. in accordance with ISO 1133 of less than 4 g/10 min in a gas-phase fluidized-bed reactor using a catalyst comprising an organic transition metal compound, in which polyolefins having an increased melt flow rate of above 4 g/10 min are prepared for a transitional period in a start-up phase.

The temporary increase in the melt flow rate (MFR) to above 4 g/10 min during the start-up phase of the reactor reduces the formation of fine particles and prevents formation of relatively large lumps. The reactor can be started up reliably in this way and trouble-free and uniform operation of the reactor is achieved even when the melt flow rate is decreased to below 4 g/10 min after the start-up phase.

Without being tied to this explanation, the effect of the process of the present invention may be due to an increased melt flow rate during start-up of the fluidized-bed reactor leading firstly to a reduction in fine particle formation as a result of improved cohesion of the polymer particles and secondly to the catalyst being retained to a greater extent in the fluidized bed as a result of the increased stickiness of the polymer particles and not depositing in the freeboard.

The process of the present invention has been developed for the start-up of gas-phase fluidized-bed reactors as are described in detail in, for example, EP-A-0 475 603, EP-A-0 089 691 and EP-A-0 571 826. In general, the gas-phase fluidized-bed reactor is a relatively long tube through which reactor gas is circulated. In general, the circulated reactor gas is fed in at the lower end of the gas-phase fluidized-bed reactor and is taken off again at its upper end. When the reactor is employed for the polymerization of α-olefins, the circulated reactor gas is preferably a mixture of the respective α-olefin or α-olefins and inert gases such as nitrogen and/or saturated hydrocarbons such as ethane, propane, butane, pentane or hexane, if desired together with a molecular weight regulator such as hydrogen. The velocity of the reactor gas has to be sufficiently high to fluidize the bed of finely divided polymer located in the tube and serving as polymerization zone and also to remove the heat of polymerization effectively.

To obtain constant reaction conditions, the constituents of the reactor gas can be fed directly into the gas-phase fluidized-bed reactor or via the circulated reactor gas. In general, it is found to be advantageous to introduce the $C_2$-$C_8$-α-olefins directly into the gas-phase fluidized-bed reactor. Furthermore, it is advantageous to introduce the catalyst and any cocatalysts used directly into the fluidized bed of finely divided polymer in the process of the present invention. It is particularly advantageous to feed the catalyst described in EP-A-226 935 into the reactor in portions using an inert gas.

Furthermore, the amount of catalyst introduced determines the product output from the gas-phase fluidized-bed reactor. It is known that its capacity is limited by the cooling capacity for the circulated reactor gas. This cooling capacity depends, firstly, on the pressure of the reactor gas or that at which the (co)polymerization is carried out It is generally advisable to employ pressures of from 1 to 100 bar, preferably from 10 to 80 bar and in particular from 15 to 50 bar. In addition, the cooling capacity also depends on the temperature at which the (co)polymerization is carried out in the fluidized bed. In the process of the present invention, it is advantageous to employ temperatures of from 30 to 125° C., particularly preferably from 75 to 118° C., during long-term operation, with preference being given to certain temperatures in the upper part of this range for copolymers of relatively high density and temperatures in the lower part of this range for copolymers of relatively low density.

The temperature during long-term operation of the reactor is particularly preferably in a range bounded by an upper limit given by equation I $$T_{RH} = 170 + \frac{6d'}{0.84 - d'} \quad (I)$$

and a lower limit given by equation II $$T_{RN} = 173 + \frac{7.3d'}{0.837 - d'} \quad (II)$$

where the variables have the following meanings:

$T_{RH}$ maximum reaction temperature in ° C.

$T_{RN}$ minimum reaction temperature in ° C.

d' value of the density d of the polymer to be produced.

According to this definition, the reaction temperature for the preparation of a polymer of the prescribed density d must not exceed the value defined by equation I and must not go below the value defined by equation II, but instead must remain between these limits. As regards details of the operating procedure in long-term operation, reference may be made to EP 571 826 B1, without restricting this to the use of Ziegler catalysts.

The density d of the resulting (co)polymers and thus the reaction temperature which it is advantageous to select is determined in the process of the present invention essentially by the ratios of the starting materials used, in particular the ratio of ethylene to $C_3$-$C_8$α-olefins.

Apart from the temperature, the proportion of inert gases such as nitrogen or hydrocarbons also has an influence on the risk of conglutination and deposits occurring. High proportions of inert gas can reduce the risk of deposits but at the same time also adversely affect the space-time yield as a result of flow catalyst productivities, so that the process can become uneconomical. In the process of the present invention, the proportion of inert gas is preferably from 15 to 75% by volume, based on the total volume of the reaction gas.

The melt flow rate of the polymerization products can be controlled using the methods customary in industry, for example by introduction of molecular weight regulators. In a preferred embodiment of the present invention, hydrogen is used as regulator for the molecular weight and thus also for the melt flow rate. It is advantageous for the reactor firstly to be started up using a hydrogen concentration which results in formation of a polymer product whose MFR is significantly above the desired 4 g/10 min. There is frequently some time delay between introduction of the catalyst and commencement of the polymerization reaction. This initiation time of the catalyst depends essentially on impurities in the reactor and can therefore vary greatly from start-up phase to start-up phase even when using the same catalyst. During this initiation time, no hydrogen is consumed in the reactor and the hydrogen initially accumulates. Since, however, an increased hydrogen concentration and thus a further increased MFR of the polymer product formed initially has no adverse effects on the start-up phase, it is advantageous to set a hydrogen concentration in the reactor during start-up of the reactor which is at least so high that a polymer product having a sufficiently high MFR is formed even when the polymerization reaction starts immediately.

In a likewise advantageous variant, the melt flow rate of above 4 g/10 min during the start-up phase can be achieved by reducing the ethylene partial pressure during this time, for example by reducing the volume flow of ethylene or by lowering the pressure.

Preference is generally given to setting the melt flow rate in the start-up phase initially to above 4.5 g/10 min and continually reducing it to the value below 4 g/10 min until the long-term operating state has been reached. Particular preference is given to an increase in the melt flow rate during the start-up phase to a value of from 5 to 50 g/10 min, most preferably from 5 to 30 g/10 min.

The start-up phase begins with the commencement of the polymerization, i.e. with the commencement of monomer consumption in the reactor. The duration of the start-up phase can, depending on reactor, reactor conditions, catalyst used, etc., be in the range from a few minutes to many hours or even days. The duration has to be such that safe and reliable start-up of the reactor is ensured. This is generally until the flows are stable and constant at the desired output. However, it is naturally also desirable for economic reasons to keep the start-up phase during which product which is not within specification is produced as short as possible. The duration of the start-up phase is preferably in the range from 30 minutes to 30 hours, particularly preferably from 1 hour to 20 hours. In a preferred embodiment of the present invention, the melt flow rate in the start-up phase is initially set to the envisaged increased value and continually decreased to the value in long-term operation.

The effect of the process of the present invention can, in an advantageous embodiment, be further improved by increasing the reactor temperature above that in long-term operation by at least 1° C. at least prior to the start-up phase, i.e. at least until the polymerization reaction starts. The temperature has to be increased prior to the start-up phase and this increased temperature may, if appropriate, also be maintained during the start-up phase. Preference is given to reducing the increased temperature during the start-up phase to the value for long-term operation. The temperature is particularly preferably decreased continually, i.e. without temperature steps. The increase in the temperature significantly reduces the proportion of catalyst which gets into the region of the calming zone during the start-up phase and further increases the uniformity of start-up. This effect is presumably attributable to the increased stickiness of the polymer particles caused by the increased temperature, so that they keep the catalyst more effectively in the fluidized bed, without being tied to this explanation.

Particular preference is given to increasing the temperature during the start-up phase by at least 1.5° C. compared to long-term operation. The upper limit to the temperature increase is imposed by the general process engineering maximum temperature up to which stable operation of the fluidized-bed reactor is ensured and depends greatly on the polymer product to be prepared, so that it may have to be determined empirically. Excellent results are achieved at a temperature increase of from 1 to 4° C., in particular from 1.5 to 3° C., compared to long-term operation. The temperature in long-term operation is advantageously set in the operating range defined by equations I and II.

The process of the present invention is intended for the polymerization of olefins, especially for the polymerization of nonpolar α-olefins; i.e. hydrocarbons having terminal double bonds, in a gas-phase fluidized-bed reactor. For the present purposes, nonpolar olefinic compounds also include aryl-substituted α-olefins. Particularly preferred α-olefins are linear or branched $C_2$-$C_{12}$-1-alkenes, in particular linear $C_2$-$C_{10}$-1-alkenes such as ethylene, propene, 1-butene, 1-pentene, 1-hexene, 1-heptene, 1-octene or 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various α-olefins.

Suitable olefins also include ones in which the double bond is part of a cyclic structure which may have one or more ring systems. Examples are cyclopentene, norbornene, tetracyclododecene and methylnorbornene and also dienes such as 5-ethylidene-2-norbornene, norbornadiene and ethylnorbornadiene.

It is also possible to polymerize mixtures of two or more olefins.

In particular, the process of the present invention can be used for the homopolymerization or copolymerization of ethene or propene. As comonomers in ethylene polymerization, preference is given to using $C_3$-$C_8$-α-olefins, in particular 1-butene, 1-pentene, 1-hexene and/or 1-octene. Particular preference is given to copolymerization of ethylene with 1-butene or 1-hexene. Preferred comonomers in the polymerization of propene are ethene and/or 1-butene.

The process of the present invention is intended to be carried out using polymerization catalysts comprising organic transition metal compounds (hereinafter referred to as catalyst component A)). Furthermore, activating compounds (catalyst component C) and/or supports (catalyst component B) and also further additives and auxiliaries may be present in the polymerization catalyst.

Possible organic transition metal compounds are in principle all compounds of transition metals of groups 3 to 12 of the Periodic Table or the lanthanides which contain organic groups and form active catalysts for olefin polymerization, preferably after reaction with the components B) and C). These are usually compounds in which at least one monodentate or polydentate ligand is bound to the central atom via a sigma or pi bond. Possible ligands include both those containing cyclopentadienyl radicals and also those which are free of cyclopentadienyl radicals. Chem. Rev. 2000, Vol. 100, No. 4, describes many such compounds A) which are suitable for olefin polymerization. Furthermore, multinuclear cyclopentadienyl complexes are also suitable for olefin polymerization.

Suitable organic transition metal compounds A) include, in particular, those having at least one cyclopentadienyl-type ligand; those having two cyclopentadienyl-type ligands are generally referred to as metallocene complexes. Particularly useful organic transition metal compounds A) having at least one cyclopentadienyl-type ligand are compounds of the formula (I)

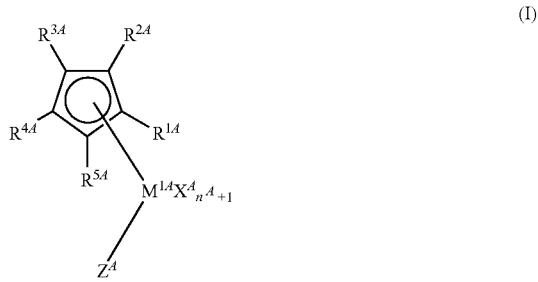

(I)

where the substituents and indices have the following meanings:

$M^{1A}$ is titanium, zirconium, hafnium, vanadium, niobium, tantallum, chromium, molybdenum or tungsten or an element of group 3 of the Periodic Table or the lanthanides, $X^A$ are identical or different and are each, independently of one another, fluorine, chlorine, bromine, iodine, hydrogen, $C_1$-$C_{10}$-alkyl, $C_2$-$C_{10}$-alkenyl, $C_6$-$C_{15}$-aryl, $C_7$-$C_{40}$-alkylaryl, $C_7$-$C_{40}$-arylalkyl, —$OR^{6A}$ or —$NR^{6A}R^{7A}$ or two radicals $X^A$ are joined to one another to form, for example, a substituted or unsubstituted diene ligand, in particular a 1,3-diene ligand, or a biaryloxy group, where $R^{6A}$ and $R^{7A}$ are each $C_1$-$C_{10}$-alkyl, $C_6$-$C_{15}$-aryl, $C_7$-$C_{40}$-arylalkyl, $C_7$-$C_{40}$-alkylaryl, fluoroalkyl or fluoroaryl each having from 1 to 16 carbon atoms in the alkyl radical and from 6 to 21 carbon atoms in the aryl radical, $n^A$ is 1, 2 or 3 and is such that, depending on the valence of M, the metallocene complex of the formula (I) is uncharged, $R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{8A}_2$, —$N(SiR^{8A}_3)_2$, —$OR^{8A}$, —$OSiR^{8A}_3$, —$SiR^{8A}_3$, where the radicals $R^{1A}$ to $R^{5A}$ may also be substituted by halogen and/or two radicals $R^{1A}$ to $R^{5A}$, in particular adjacent radicals, may be joined so that they together with the atoms connecting them form a preferably a five-, six- or seven-membered ring or a preferably five-, six- or seven-membered heterocycle containing at least one atom from the group consisting of N, P, O and S, where $R^{8A}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^A$ as defined for $X^A$ or is

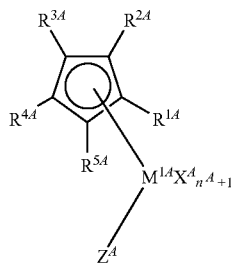

where the radicals $R^{9A}$ to $R^{13A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{14A}_2$, —$N(SiR^{14A}_3)_2$, —$OR^{14A}$, —$OSiR^{14A}_3$, —$SiR^{14A}_3$, where the radicals $R^{1A}$ to $R^{5A}$ may also be substituted by halogen and/or two radicals $R^{1A}$ to $R^{5A}$, in particular adjacent radicals, may be joined so that they together with the atoms connecting them form a preferably five-, six- or seven-membered ring or a preferably five-, six- or seven-membered heterocycle containing at least one atom from the group consisting of N, P, O and S, where $R^{14A}$ are identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, or the radicals $R^{4A}$ and $Z^A$ together form a —$R^{15A}_{v^A}$-$A^A$- group, where
$R^{15A}$ is

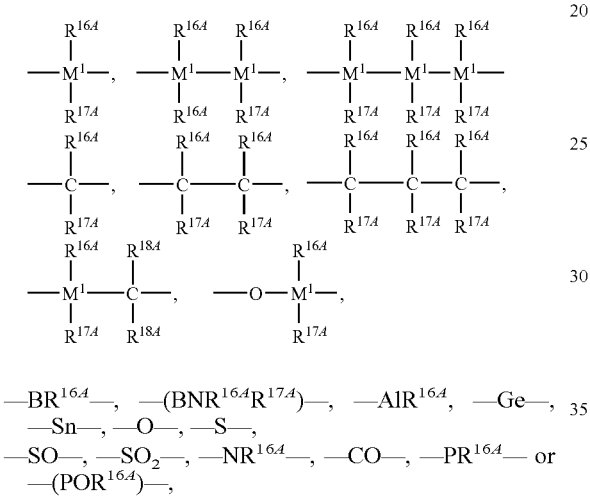

—$BR^{16A}$—, —$(BNR^{16A}R^{17A})$—, —$AlR^{16A}$, —Ge—, —Sn—, —O—, —S—,
—SO—, —$SO_2$—, —$NR^{16A}$—, —CO—, —$PR^{16A}$— or —$(POR^{16A})$—, where
$R^{16A}$, $R^{17A}$ and $R^{18A}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and
$M^{2A}$ is silicon, germanium or tin, preferably silicon,
$A^A$ is —O—, —S—, —$NR^{19A}$—, —$PR^{19A}$—, —O—$R^{19A}$, —$NR^{19A}_2$, —$PR^{19A}_2$
or an unsubstituted, substituted or fused, heterocyclic ring system, where
$R^{19A}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or —Si$(R^{20A})_3$,
$R^{20A}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl,
$v^A$ is 1 or, if $A^A$ is an unsubstituted, substituted or fused, heterocyclic ring system, 1 or 0, or the radicals $R^{4A}$ and $R^{12A}$ together form a —$R^{15A}$— group.

The radicals $X^A$ in the formula (I) are preferably identical, particularly preferably fluorine, chlorine, bromine, $C_1$-$C_7$-alkyl or arylalkyl, in particular chlorine, methyl or benzyl.

Among the organic transition metal compounds of the formula (I), preference is given to

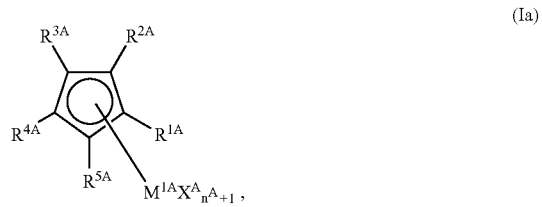

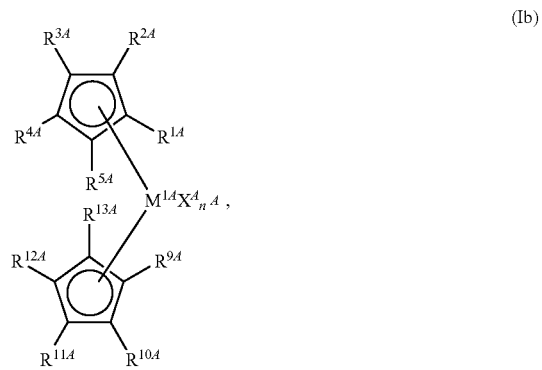

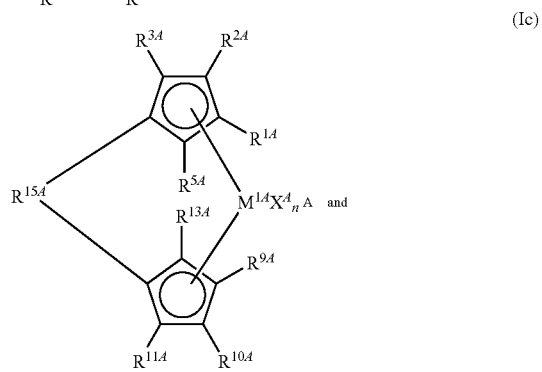

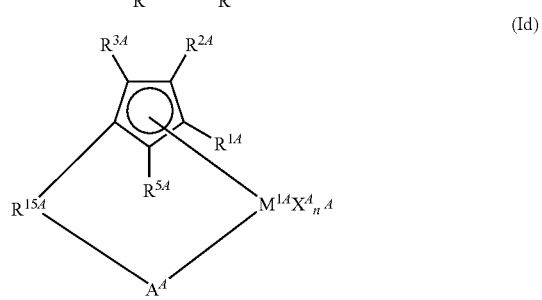

Among the compounds of the formula (Ia), particular preference is given to those in which
$M^{1A}$ is titanium or chromium,
$X^A$ is chlorine, $C_1$-$C_4$-alkyl, phenyl, alkoxy or aryloxy,
$n^A$ is 1 or 2 and
$R^{1A}$ to $R^{5A}$ are each hydrogen or $C_1$-$C_4$-alkyl or two adjacent radicals $R^{1A}$ to $R^{5A}$ together with the atoms connecting them form a substituted or unsubstituted unsaturated six-membered ring.

Among the metallocenes of the formula (Ib), preference is given to those in which
$M^{1A}$ is titanium, zirconium, hafnium or chromium,
$X^A$ is chlorine, $C_1$-$C_4$-alkyl or benzyl, or two radicals $R^x$ form a substituted or unsubstituted butadiene ligand,
$n^A$ is 1 or 2, preferably 2, or, if $M^{1A}$ is chromium, 0, $R^{1A}$ to $R^{5A}$ are each hydrogen, $C_1$-$C_8$-alkyl, $C_6$-$C_{10}$-aryl, —$NR^{8A}_2$, —$OSiR^{8A}_3$, —$SiR^{8A}_3$ or —$Si(R^{8A})_3$ and $R^{9A}$ to $R^{13A}$ are each hydrogen, $C_1$-$C_8$-alkyl, $C_6$-$C_{10}$-aryl, —$NR^{8A}_2$, —$OSiR^{8A}_3$, —$SiR^{8A}_3$ or —$Si(R^{8A})_3$, or in each case two radicals $R^{1A}$ to $R^{5A}$ and/or $R^{9A}$ to $R^{13A}$ together with the cyclopentadienyl ring form an indenyl or substituted indenyl system.

Particularly useful compounds of the formula (Ib) are ones in which the cyclopentadienyl radicals are identical.

Examples of particularly suitable compounds of the formula (Ib) are bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride,
bis(1-n-butyl-3-methylcyclopentadienyl)zirconium dichloride,
bis(indenyl)zirconium dichloride,
bis(tetrahydroindenyl)zirconium dichloride and
bis(trimethylsilylcyclopentadienyl)zirconium dichloride and also the corresponding dimethylzirconium compounds.

Particularly useful metallocenes of the formula (Ic) are those in which $R^{1A}$ and $R^{9A}$ are identical or different and are each hydrogen or a $C_1$-$C_{10}$-alkyl group, $R^{5A}$ and $R^{13A}$ are identical or different and are each hydrogen or a methyl, ethyl, isopropyl or tert-butyl group, $R^{3A}$ and $R^{11A}$ are each $C_1$-$C_4$-alkyl and $R^{2A}$ and $R^{10A}$ are each hydrogen or two adjacent radicals $R^{2A}$ and $R^{3A}$ or $R^{10A}$ and $R^{11A}$ together form a saturated or unsaturated cyclic group having from 4 to 44 carbon atoms, $R^{15A}$ is -$M^{2A}R^{16A}R^{17A}$— or —$CR^{16A}R^{17A}$—$CR^{16A}R^{17A}$— or —$BR^{16A}$— or —$BNR^{16A}R^{17A}$—, $M^{1A}$ is titanium, zirconium or hafnium and $X^A$ are identical or different and are each chlorine, $C_1$-$C_4$-alkyl, benzyl, phenyl or $C_7$-$C_{15}$-alkylaryloxy.

Particularly useful compounds of the formula (Ic) are compounds of the formula (Ic')

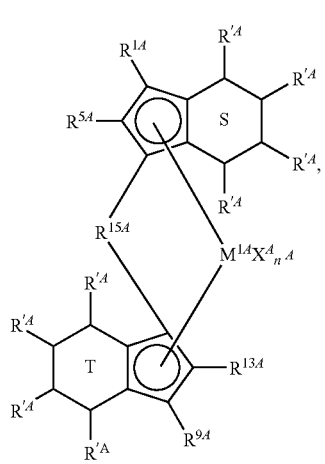

(Ic')

where the radicals $R'^A$ are identical or different and are each hydrogen, $C_1$-$C_{10}$-alkyl or $C_3$-$C_{10}$-cycloalkyl, preferably methyl, ethyl, isopropyl or cyclohexyl, $C_6$-$C_{20}$-aryl, preferably phenyl, naphthyl or mesityl, $C_7$-$C_{40}$-arylalkyl, $C_7$-$C_{40}$-alkylaryl, preferably 4-tert-butylphenyl or 3,5-di-tert-butylphenyl, or $C_8$-$C_{40}$-arylalkenyl, $R^{5A}$ and $R^{13A}$ are identical or different and are each hydrogen, $C_1$-$C_6$-alkyl, preferably methyl, ethyl, isopropyl, n-propyl, n-butyl, n-hexyl or tert-butyl, and the rings S and T are each, independently of one another, saturated, unsaturated or partially saturated.

The indenyl or tetrahydroindenyl ligands of the metallocenes of the formula (Ic') are preferably substituted in the 2 position, the 2,4 positions, the 4,7 positions, the 2,4,7 positions, the 2,6 positions, the 2,4,6 positions, the 2,5,6 positions, the 2,4,5,6 positions or the 2,4,5,6,7 positions, in particular in the 2,4 positions, with the following numbering applying to the site of substitution:

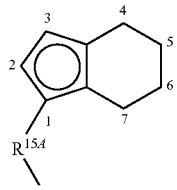

Preference is given to using bridged bis-indenyl complexes in the rac or pseudo-rac form as complexes (Ic'). The term "pseudo-rac form" refers to complexes in which the two indenyl ligands are in the rac arrangement relative to one another when all other substituents of the complex are disregarded.

Examples of particularly useful metallocenes (Ic) and (Ic') are dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsitanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methyl-4,5-benzindenyl)zirconium dichloride dimethylsilanediylbis(2-ethyl-4,5-benzindenyl)zirconium dichloride
methylphenylsilanediylbis(2-methyl-4,5-benzindenyl)zirconium dichloride,
methylphenylsilanediylbis(2-ethyl-4,5-benzindenyl)zirconium dichloride,
diphenylsilanediylbis(2-methyl-4,5-benzindenyl)zirconium dichloride,
diphenylsilanediylbis(2-ethyl-4,5-benzindenyl)zirconium dichloride,
diphenylsilanediylbis(2-methylindenyl)hafnium dichloride,
dimethylsilanediylbis(2-methyl-4-phenylindenyl)zirconium dichloride,
dimethylsilanediylbis(2-ethyl-4-phenylindenyl)zirconium dichloride,
dimethylsilanediylbis(2-methyl-4-(1-naphthyl)indenyl)zirconium dichloride,
dimethylsilanediylbis(2-ethyl-4-(1-naphthyl)indenyl)zirconium dichloride,
dimethylsilanediylbis(2-propyl-4-(1-naphthyl)indenyl)zirconium dichloride,
dimethylsilanediylbis(2-i-butyl-4-(1-naphthyl)indenyl)zirconium dichloride;
dimethylsilanediylbis(2-propyl-4-(9-phenanthryl)indenyl)zirconium dichloride,
dimethylsilanediylbis(2-methyl-4-isopropylindenyl)zirconium dichloride,
dimethylsilanediylbis(2,7-dimethyl-4-isopropylindenyl)zirconium dichloride,
dimethylsilanediylbis(2-methyl-4,6-diisopropylindenyl)zirconium dichloride,
dimethylsilanediylbis(2-methyl-4-[p-trifluoromethylphenyl]indenyl)zirconium dichloride,
dimethylsilanediylbis(2-methyl-4-[3',5'-dimethylphenyl]indenyl)zirconium dichloride,
dimethylsilanediylbis(2-methyl-4-[4'-tert-butylphenyl]indenyl)zirconium dichloride,
diethylsilanediylbis(2-methyl-4-[4'-tert-butylphenyl]indenyl)zirconium dichloride,
dimethylsilanediylbis(2-ethyl-4-[4'-tert-butylphenyl]indenyl)zirconium dichloride,
dimethylsilanediylbis(2-propyl-4-[4'-tert-butylphenyl]indenyl)zirconium dichloride,
dimethylsilanediylbis(2-isopropyl-4-[4'-tert-butylphenyl]indenyl)zirconium dichloride,
dimethylsilanediylbis(2-n-butyl-4-[4'-tert-butylphenyl]indenyl)zirconium dichloride,
dimethylsilanediylbis(2-hexyl-4-[4'-tert-butylphenyl]indenyl)zirconium dichloride,
dimethylsilanediyl(2-isopropyl-4-phenylindenyl)(2-methyl-4-phenylindenyl)zirconium dichloride,
dimethylsilanediyl(2-isopropyl-4-(1-naphthyl)indenyl)(2-methyl-4-(1-naphthyl)indenyl)zirconium dichloride,
dimethylsilanediyl(2-isopropyl-4-[4'-tert-butylphenyl]indenyl)(2-methyl-4-[4'-tert-butylphenyl]-indenyl)zirconium dichloride,
dimethylsilanediyl(2-isopropyl-4-[4'-tert-butylphenyl]indenyl)(2-ethyl-4-[4'-tert-butylphenyl]indenyl)-zirconium dichloride,
dimethylsilanediyl(2-isopropyl-4-[4'-tert-butylphenyl]indenyl)(2-methyl-4-[3',5'-bis-tert-butylphenyl]-indenyl)zirconium dichloride,
dimethylsilanediyl(2-isopropyl-4-[4'-tert-butylphenyl]indenyl)(2-methyl-4-[1'-naphthyl]indenyl)-zirconium dichloride and
ethylene(2-isopropyl-4-[4'-tert-butylphenyl]indenyl)(2-methyl-4-[4'-tert-butylphenyl]indenyl)-zirconium dichloride and also the corresponding dimethylzirconium, zirconium monochloride mono(alkylaryloxide) and zirconium di(alkylaryloxide) compounds.

Particularly useful compounds of the formula (Id) are those in which $M^{1A}$ is titanium or zirconium, in particular titanium, and $X^A$ is chlorine, $C_1$-$C_4$-alkyl or phenyl or two radicals X form a substituted or unsubstituted butadiene ligand, $R^{15A}$ is —$SiR^{16A}R^{17A}$— or —$CR^{16A}R^{17A}$—$CR^{16A}R^{17A}$—, $A^A$ is —O—, —S— or —$NR^{19A}$—, $R^{1A}$ to $R^{3A}$ and $R^{5A}$ are each hydrogen, $C_1$-$C_{10}$-alkyl, preferably methyl, $C_3$-$C_{10}$-cycloalkyl, $C_6$-$C_{15}$-aryl or —$Si(R^{8A})_3$, or two adjacent radicals form a cyclic group having from 4 to 12 carbon atoms, with particular preference being given to all $R^{1A}$ to $R^{3A}$ and $R^{5A}$ being methyl.

Another group of compounds of the formula (Id) which are particularly useful are those in which $M^{1A}$ is titanium or chromium, preferably in the oxidation state III, and $X^A$ is chlorine, $C_1$-$C_4$-alkyl or phenyl or two radicals $X^A$ are a substituted or unsubstituted-butadiene ligand, $R^{15A}$ is —$SiR^{16A}R^{17A}$— or —$CR^{16A}R^{17A}$—$CR^{16A}R^{17A}$—, $A^A$ is —O—$R^{19A}$, —$NR^{19A}_2$, —$PR^{19A}_2$ $R^{1A}$ to $R^{3A}$ and $R^{5A}$ are each hydrogen, $C_1$-$C_{10}$-alkyl, $C_3$-$C_{10}$-cycloalkyl, $C_6$-$C_{15}$-aryl or —$Si(R^{8A})_3$, or two adjacent radicals form a cyclic group having from 4 to 12 carbon atoms.

Such complexes can be synthesized by methods known per se, preferably by reaction of the appropriately substituted, cyclic hydrocarbon anion with halides of titanium, zirconium, hafnium, vanadium, niobium, tantalum or chromium.

Examples of appropriate preparative methods are described, inter alia, in Journal of Organometallic Chemistry, 369 (1989), 359-370.

Further suitable organic transition metal compounds A) are metallocenes having at least one ligand formed by a cyclopentadienyl or heterocyclopentadienyl having a fused-on heterocycle, where, in the heterocycles, at least one carbon atom is replaced by a heteroatom, preferably a heteroatom from group 15 or 16 of the Periodic Table, in particular by nitrogen or sulfur. Such compounds are described, for example, in WO 98/22486. They include, in particular, dimethylsilanediyl(2-methyl-4-phenylindenyl)(2,5-dimethyl-N-phenyl-4-azapentalene)zirconium dichloride,
dimethylsilanediylbis(2-methyl-4-phenyl-4-hydroazulenyl) zirconium dichloride and
dimethylsilanediylbis(2-ethyl-4-phenyl-4-hydroazulenyl) zirconium dichloride.

Further organic transition metal compounds A) which are suitable for the purposes of the present invention include transition metal complexes having at least one ligand of the formulae (IIa) to (IIe),

(IIa)

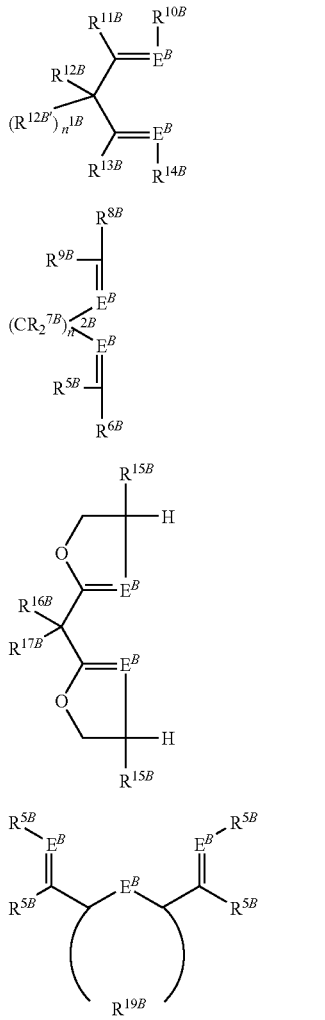

where the transition metal is selected from among the elements Ti, Zr, Hf, Sc, V, Nb, Ta, Cr, Mo, W, Fe, Co, Ni, Pd, Pt and the elements of the rare earth metals. Preference is given to compounds having nickel, iron, cobalt or palladium as central metal.

$E^B$ is an element of group 15 of the Periodic Table of the Elements, preferably N or P, with particular preference being given to N. The two or three atoms $E^B$ in a molecule can be identical or different.

The radicals $R^{1B}$ to $R^{19B}$, which may be identical or different within a ligand system of the formulae (IIa) to (IIe), are as follows:

$R^{1B}$ and $R^{4B}$ are each, independently of one another, a hydrocarbon radical or a substituted hydrocarbon radical, preferably a hydrocarbon radical in which the carbon atom adjacent to the element $E^B$ is bound to at least two carbon atoms, $R^{2B}$ and $R^{3B}$ are each, independently of one another, hydrogen, a hydrocarbon radical or a substituted hydrocarbon radical, where $R^{2B}$ and $R^{3B}$ may also together form a ring system in which one or more heteroatoms may be present, $R^{6B}$ and $R^{8B}$ are each, independently of one another, a hydrocarbon radical or a substituted hydrocarbon radical, $R^{5B}$ and $R^{9B}$ are each, independently of one another, hydrogen, a hydrocarbon radical or a substituted hydrocarbon radical, where $R^{6B}$ and $R^{5B}$ or $R^{8B}$ and $R^{9B}$ may also together form a ring system, $R^{7B}$ are each, independently of one another, hydrogen, a hydrocarbon radical or a substituted hydrocarbon radical, where two $R^{7A}$ may also together form a ring system, $R^{10B}$ and $R^{14B}$ are each, independently of one another, a hydrocarbon radical or a substituted hydrocarbon radical, $R^{11B}$, $R^{12B}$, $R^{12B'}$ and $R^{13B}$ are each, independently of one another, hydrogen, a hydrocarbon radical or a substituted hydrocarbon radical, where two or more geminal or vicinal radicals $R^{11B}$, $R^{12B}$, $R^{12B'}$ and $R^{13B}$ may also together form a ring system, $R^{15B}$ and $R^{18B}$ are each, independently of one another, hydrogen, a hydrocarbon radical or a substituted hydrocarbon radical, $R^{16B}$ and $R^{17B}$ are each, independently of one another, hydrogen, a hydrocarbon radical or a substituted hydrocarbon radical, $R^{19B}$ is an organic radical which forms a 5- to 7-membered substituted or unsubstituted, in particular unsaturated or aromatic, heterocyclic ring system, in particular together with $E^B$ a pyridine system, $n^{1B}$ is 0 or 1, with the compounds of the formula (IIc) being negatively charged when $n^{1B}$ is 0, and $n^{2B}$ is an integer from 1 to 4, preferably 2 or 3.

Particularly useful transition metal complexes having ligands of the formulae (IIa) to (IId) are, for example, complexes of the transition metals Fe, Co, Ni, Pd or Pt with ligands of the formula (IIa). Particular preference is given to diimine complexes of Ni or Pd, e.g.:

di(2,6-di-i-propylphenyl)-2,3-dimethyldiazabutadienepalladium dichloride,
di(di-i-propylphenyl)-2,3-dimethyldiazabutadienenickel dichloride,
di(2,6-di-i-propylphenyl)-2,3-dimethyldiazabutadienedimethylpalladium,
di(2,6-di-i-propylphenyl)-2,3-dimethyldiazabutadienedimethylnickel,
di(2,6-dimethylphenyl)-2,3-dimethyldiazabutadienrpalladium dichloride,
di(2,6-dimethylphenyl)-2,3-dimethyldiazabutadienenickel dichloride,
di(2,6-dimethylphenyl)-2,3-dimethyldiazabutadienedimethylpalladium,
di(2,6-dimethylphenyl)-2,3-dimethyldiazabutadienedimethylnickel,
di(2-methylphenyl)-2,3-dimethyldiazabutadienepalladium dichloride,
di(2-methylphenyl)-2,3-dimethyldiazabutadienenickel dichloride,
di(2-methylphenyl)-2,3-dimethyldiazabutadienedimethylpalladium,
di(2-methylphenyl)-2,3-dimethyldiazabutadienedimethylnickel,
diphenyl-2,3-dimethyldiazabutadienepalladium dichloride,
diphenyl-2,3-dimethyldiazabutadienenickel dichloride,
diphenyl-2,3-dimethyldiazabutadienedimethylpalladium,
diphenyl-2,3-dimethyldiazabutadienedimethylnickel,
di(2,6-dimethylphenyl)azanaphthenepalladium dichloride,
di(2,6-dimethylphenyl)azanaphthenenickel dichloride,
di(2,6-dimethylphenyl)azanaphthenedimethylpalladium,
di(2,6-dimethylphenyl)azanaphthenedimethylnickel,
1,1'-bipyridylpalladium dichloride, 1,1'-bipyridylnickel dichloride,
1,1'-bipyridyl(dimethyl)palladium or
1,1'-bipyridyl(dimethyl)nickel.

Particularly useful compounds (IIe) include those described in J. Am. Chem. Soc. 120, p. 4049 ff. (1998), J. Chem. Soc., Chem. Commun. 1998, 849. Preferred complexes having ligands (IIe) are 2,6-bis(imino)pyridyl complexes of the transition metals Fe, Co, Ni, Pd or Pt, in particular Fe.

Iminophenoxide complexes can also be used as organometallic transition metal compound A). The ligands of these complexes can be prepared, for example, from substituted or unsubstituted salicylaldehydes and primary amines, in particular substituted or unsubstituted arylamines. Transition metal complexes with pi ligands having one or more heteroatoms in the pi system, for example the boratabenzene ligand, the pyrrolyl anion or the phospholyl anion, can also be used as organic transition metal compounds A).

Further transition metal compounds A) which are suitable for the purposes of the present invention are substituted monocyclopentadienyl, monoindenyl, monofluorenyl- or heterocyclopentadienyl complexes of chromium, molybdenum or tungsten in which at least one of the substituents on the cyclopentadienyl ring bears a rigid donor function which is not bound exclusively via $sp^3$-hybridized carbon or silicon atoms. The most direct link to the donor function thus contains at least one sp- or $sp^2$-hybridized carbon atom, preferably from one to three $sp^2$-hybridized carbon atoms. The most direct link preferably contains an unsaturated double bond or an aromatic or together with the donor forms a partially unsaturated or aromatic heterocyclic system.

In these transition metal compounds, the cyclopentadienyl ring can also be a heterocyclopentadienyl ligand, i.e. at least one carbon atom can be replaced by a heteroatom from group 15 or 16. In this case, preference is given to one carbon atom in the five-membered ring being replaced by phosphorus. In particular, the cyclopentadienyl ring is substituted by further alkyl groups which may also form a five- or six-membered ring, e.g. as in tetrahydroindenyl, indenyl, benzindenyl or fluorenyl.

Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide, or unsubstituted, substituted or fused, partially unsaturated heterocyclic or heteroaromatic ring systems.

Here, preference is given to using substituted monocyclopentadienyl, monoindenyl, monofluorenyl or heterocyclopentadienyl complexes of the formula (III)

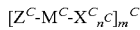  (III), where
$M^C$ is chromium, molybdenum or tungsten and
$Z^C$ has the formula (IIIa)

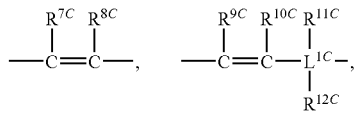

where the variables have the following meanings:
$E^{1C}$-$E^{5C}$ are each carbon or not more than one atom $E^{1C}$ to $E^{5C}$ is phosphorus or nitrogen,
$A^C$ is $-NR^{5C}R^{6C}$, $-PR^{5C}R^{6C}$, $-OR^{5C}$, $-SR^{5C}$ or an unsubstituted, substituted or fused, partially unsaturated heterocyclic or heteroaromatic ring system,
$R^C$ is one of the following groups:

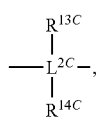

and, if $A^C$ is an unsubstituted, substituted or fused, partially unsaturated heterocyclic or heteroaromatic ring system, also

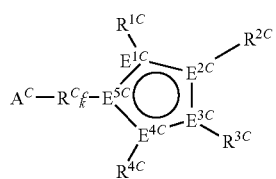

where
$L^{1C}$, $L^{2C}$ are each silicon or carbon,
$k^C$ is 1 or, if $A^{1C}$ is an unsubstituted, substituted or fused, partially unsaturated heterocyclic or heteroaromatic ring system, may also be 0,
$X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, $-NR^{15C}R^{16C}$, $-OR^{15C}$, $-SR^{15C}$, $-SO_3R^{15C}$, $-OC(O)R^{15C}$, $-CN$, $-SCN$, β-diketonate, $-CO$, $BF_4^-$, $PF_6^-$ or a bulky noncoordinating anion,
$R^{1C}$-$R^{16C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, alkylaryl having from 1 to 10 carbon atoms in the alkyl part and 6-20 carbon atoms in the aryl part, $SiR^{17C}_3$, where the organic radicals $R^{1B}$-$R^{16B}$ may also be substituted by halogens and two geminal or vicinal radicals $R^{1C}$-$R^{16C}$ may also be joined to form a five- or six-membered ring,
$R^{17C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, or two geminal radicals $R^{17C}$ may also be joined to form a five- or six-membered ring,
$n^C$ is 1, 2 or 3 and
$m^C$ is 1, 2 or 3.

The transition metal $M^C$ is particularly preferably chromium.

Examples of organic transition metal compounds of the formula (III) are
1-(8-quinolyl)-2-methyl-4-methylcyclopentadienylchromium(III) dichloride,
1-(8-quinolyl)-3-isopropyl-5-methylcyclopentadienylchromium(III) dichloride,
1-(8-quinolyl)-3-tert-butyl-5-methylcyclopentadienylchromium(III) dichloride,
1-(8-quinolyl)-2,3,4,5-tetramethylcyclopentadienylchromium(III) dichloride,
1-(8-quinolyl)tetrahydroindenylchromium(III) dichloride,
1-(8-quinolyl)indenylchromium(III) dichloride,
1-(8-quinolyl)-2-methylindenylchromium(III) dichloride,
1-(8-quinolyl)-2-isopropylindenylchromium(III) dichloride, 1-(8-quinolyl)-2-ethylindenylchromium(III) dichloride,
1-(8-quinolyl)-2-tert-butylindenylchromium(III) dichloride,
1-(8-quinolyl)benzindenylchromium(III) dichloride,
1-(8-quinolyl)-2-methylbenzindenylchromium(III) dichloride,
1-(8-(2-methylquinolyl))-2-methyl-4-methylcyclopentadienylchromium(III) dichloride,
1-(8-(2-methylquinolyl))-2,3,4,5-tetramethylcyclopentadienylchromium(III) dichloride,
1-(8-(2-methylquinolyl))tetrahydroindenylchromium(III) dichloride,
1-(8-(2-methylquinolyl))indenylchromium(III) dichloride,
1-(8-(2-methylquinolyl))-2-methylindenylchromium(III) dichloride,
1-(8-(2-methylquinolyl))-2-isopropylindenylchromium(III) dichloride,
1-(8-(2-methylquinolyl))-2-ethylindenylchromium(III) dichloride,
1-(8-(2-methylquinolyl))-2-tert-butylindenylchromium(III) dichloride,
1-(8-(2-methylquinolyl))benzindenylchromium(III) dichlorid or
1-(8-(2-methylquinolyl))-2-methylbenzindenylchromium (III) dichloride.

The preparation of functional cyclopentadienyl ligands has been known for a long time. Various synthetic routes to these complexing ligands are described by, for example, M. Enders et al. in Chem. Ber. (1996), 129, 459-463 or P. Jutzi and U. Siemeling in J. Organomet Chem. (1995), 500, 175-185.

The metal complexes, in particular the chromium complexes, can be obtained in a simple manner by reacting the appropriate metal salts, e.g. metal chlorides, with the ligand anion (e.g. using a method analogous to the examples in DE-A 197 10 615).

Additional transition metal compounds A) which are suitable for the purposes of the present invention include imidochromium compounds of the formula (IV),

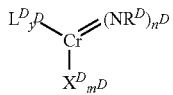
(IV)

where the variables have the following meanings:
$R^D$ is $R^{1D}C$=$NR^{2D}$, $R^{1D}C$=$O$, $R^{1D}C$=$O(OR^{2D})$, $R^{1D}C$=$S$, $(R^{1D})_2P$=$O$, $(OR^{1D})_2P$=$O$, $SO_2R^{1D}$, $R^{1D}R^{2D}C$=$N$, $NR^{1D}R^{2D}$ or $BR^{1D}R^{2D}$, $C_1$-$C_{20}$-alkyl, $C_1$-$C_{20}$-cycloalkyl, $C_2$-$C_{20}$-alkenyl, $C_6$-$C_{20}$-aryl, $C_7$-$C_{40}$-alkylaryl, hydrogen if this is bound to a carbon atom, where the organic substituents $R^{1D}$ and $R^{2D}$ may also bear inert substituents,
$X^D$ are each, independently of one another, fluorine, chlorine, bromine, iodine, —$NR^{3D}R^{4D}$, —$NP(R^{3D})_3$, —$OR^{3D}$, —$OSi(R^{3D})_3$, —$SO_3R^{3D}$, —$OC(O)R^{3D}$, β-diketonate, $BF_4^-$, $PF_6^-$ or a bulky weakly coordinating or noncoordinating anion,
$R^{1D}$-$R^{4D}$ are each, independently of one another, $C_1$-$C_{20}$-alkyl, $C_2$-$C_{20}$-alkenyl, $C_6$-$C_{20}$-aryl, $C_7$-$C_{40}$-alkylaryl, hydrogen if this is bound to a carbon atom, where the organic radicals $R^{1D}$ to $R^{4D}$ may also bear inert substituents,
$n^D$ is 1 or 2,
$m^D$ is 1, 2 or 3 and has a value such that, depending on the valence of Cr, the metallocene complex of the formula (IV) is uncharged,
$L^D$ is an uncharged donor and
$y^D$ is from 0 to 3.

Such compounds and their preparation are described, for example, in WO 01/09148.

Further suitable transition metal compounds A) include transition metal complexes having a tridentate macrocyclic ligand, e.g.
[1,3,5-tri(methyl)-1,3,5-triazacyclohexane]chromium trichloride,
[1,3,5-tri(ethyl)-1,3,5-triazacyclohexane]chromium trichloride,
[1,3,5-tri(octyl)-1,3,5-triazacyclohexane]chromium trichloride,
[1,3,5-tri(dodecyl)-1,3,5-triazacyclohexane]chromium trichlorid and
[1,3,5-tri(benzyl)-1,3,5-triazacyclohexane]chromium trichloride.

Mixtures of various organic transition metal compounds can also be used as component A).

An important prerequisite for use in the process of the present invention is the ability of the organic transition metal compounds to produce polymers having a melt flow rate of less than 4 g/10 min, i.e. relatively high molecular weight polymers.

The polymerization behavior of the organic transition metal compounds can be influenced by varying the substituents $R^{1A}$-$R^{13A}$. The number and type of substituents can influence the ability of the olefins to be polymerized to gain access to the metal atom M. This makes it possible to modify the activity and selectivity of the catalyst in respect of various monomers, in particular bulky monomers. Since the substituents can also influence the rate of termination reactions of the growing polymer chain, the molecular weight of the polymers formed can also be altered in this way. The chemical structure of the substituents $R^1$ to $R^5$ and $R^{1A}$-$R^{13A}$ can therefore be varied within a wide range in order to achieve the desired results and obtain a tailored catalyst system.

The process of the present invention is particularly effective when unbridged metallocene catalysts of the formula (Ib) containing zirconium as transition metal are used. Catalyst systems based on bis(1-methyl-3-butylcyclopentadienyl)zirconium dichloride are particularly useful for preparing high molecular weight polymer products having a low melt flow rate (MFR), but have a particularly strong tendency to form fine particles and lumps in gas-phase fluidized-bed reactors, in particular when starting up the reactor. Particularly good results are obtained when start-up is carried out with formation of products having a high MFR and also at elevated temperature. However, it should be emphasized that although an increase in temperature achieves a further improvement in the start-up in the case of many metallocene catalysts, it is not necessary according to the present invention.

Some of the organic transition metal compounds A) have little polymerization activity on their own and are therefore brought into contact with an activating compound so as to be able to display good polymerization activity. For this reason, the catalyst system optionally further comprises one or more activation compounds as component C).

Suitable compounds C) which are able to react with the organic transition metal compound, preferably a metallocene, to convert it into a catalytically active, or more active, compound are, for example, compounds such as an aluminoxane, a strong uncharged Lewis acid, an ionic compound having a Lewis-acid cation or an ionic compound containing a Brönsted acid as cation.

The amount of activating compounds to be used depends on the type of activator. In general, the molar ratio of metal complex A) to activating compound C) can be from 1:0.1 to 1:10 000, preferably from 1:1 to 1:2000.

The process of the present invention is preferably carried out using at least one aluminoxane as activating compound. As aluminoxanes, it is possible to use, for example, the compounds described in WO 00/31090. Particularly useful aluminoxanes are open-chain or cyclic aluminoxanes of the formula (Va) or (Vb)

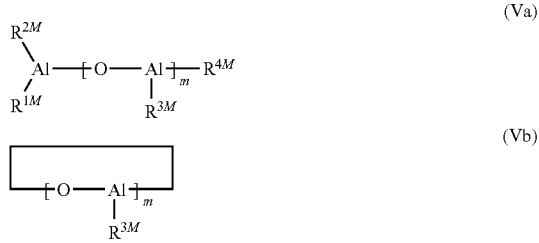

where $R^{1M}$-$R^{4M}$ are each, independently of one another, a $C_1$-$C_6$-alkyl group, preferably a methyl, ethyl, butyl or isobutyl group, and m is an integer from 1 to 40, preferably from 4 to 25.

A particularly useful aluminoxane is methylaluminoxane (MAO).

These oligomeric aluminoxane compounds are usually prepared by controlled reaction of a solution of trialkylaluminum, in particular trimethylaluminum, with water. In general, the oligomeric aluminoxane compounds obtained in this way are in the form of mixtures of both linear and cyclic chain molecules of various lengths, so that m is to be regarded as a mean. The aluminoxane compounds can also be present in admixture with other metal alkyls, usually aluminum alkyls. Aluminoxane preparations suitable as component C) are commercially available.

Furthermore, modified aluminoxanes in which some of the hydrocarbon radicals have been replaced by hydrogen atoms or alkoxy, aryloxy, siloxy or amide radicals can also be used as component C) in place of the aluminoxane compounds of the formula (Va) or (Vb).

It has been found to be advantageous to use the organic transition metal compounds A) and the aluminoxanes in such amounts that the atomic ratio of aluminum from the aluminoxanes including any aluminum alkyl still present to the transition metal from the metallocene complex A) is in the range from 1:1 to 2000:1, preferably from 10:1 to 500:1 and in particular in the range from 20:1 to 400:1.

A further class of suitable activating components C) are hydroxyaluminoxanes. These can be prepared, for example, by addition of from 0.5 to 1.2 equivalents of water, preferably from 0.8 to 1.2 equivalents of water, per equivalent of aluminum to an alkylaluminum compound, in particular triisobutylaluminum, at low temperatures, usually below 0° C. Such compounds and their use in olefin polymerization are described, for example, in WO 00/24787. The atomic ratio of aluminum from the hydroxyaluminoxane compound to the transition metal from the metallocene complex A) is usually in the range from 1:1 to 100:1, preferably from 10:1 to 50:1 and in particular in the range from 20:1 to 40:1.

As strong, uncharged Lewis acids, preference is given to compounds of the formula (VI)

$$M^{2D}X^{1D}X^{2D}X^{3D} \qquad (VI)$$

where $M^{2D}$ is an element of group 13 of the Periodic Table of the Elements, in particular B, Al or Ga, preferably B, $X^{1D}$, $X^{2D}$ and $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Further examples of strong, uncharged Lewis acids are given in WO 00/31090.

Compounds of this type which are particularly useful as component C) are boranes and boroxins such as trialkylborane, triarylborane or trimethylboroxin. Particular preference is given to using boranes which bear at least two perfluorinated aryl radicals. Particular preference is given to compounds of the formula (XII) in which $X^{1D}$, $X^{2D}$ and $X^{3D}$ are identical, preferably tris(pentafluorophenyl)borane.

Suitable compounds C) are preferably prepared by reaction of aluminum or boron compounds of the formula (XII) with water, alcohols, phenol derivatives, thiophenol derivatives or aniline derivatives, with halogenated and especially perfluorinated alcohols and phenols being of particular importance. Examples of particularly useful compounds are pentafluorophenol, 1,1-bis(pentafluorophenyl)methanol and 4-hydroxy-2,2',3,3',4',5,5',6,6'-nonafluorobiphenyl. Examples of combinations of compounds of the formula (XII) with Brönsted acids are, in particular, trimethylaluminum/pentafluorophenol, trimethylaluminum/1-bis(pentafluorophenyl)methanol, trimethylaluminum/4-hydroxy-2,2',3,3',4',5,5',6,6'-nonafluorobiphenyl, triethylaluminum/pentafluorophenol and triisobutylaluminum/pentafluorophenol and triethylaluminum/4,4'-dihydroxy-2,2',3,3',5,5',6,6'-octafluorobiphenyl hydrate.

In further suitable aluminum and boron compounds of the formula (XII), $R^{1D}$ is an OH group. Examples of compounds of this type are boronic acids and borinic acids, in particular borinic acids having perfluorinated aryl radicals, for example $(C_6H_5)_2BOH$.

Strong uncharged Lewis acids suitable as activating compounds C) also include the reaction products of a boronic acid with two equivalents of an aluminum trialkyl or the reaction products of an aluminum trialkyl with two equivalents of an acidic fluorinated, in particular perfluorinated, hydrocarbon compound such as pentafluorophenol or bis(pentafluorophenyl)borinic acid.

The suitable ionic compounds having Lewis-acid cations include salt-like compounds of the cation of the formula (XIII)

$$[((M^{3D})^{a+})Q_1Q_2 \ldots Q_z]^{d+} \qquad (XIII)$$

where $M^{3D}$ is an element of groups 1 to 16 of the Periodic Table of the Elements, $Q_1$ to $Q_z$ are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups, a is an integer from 1 to 6 and z is an integer from 0 to 5, d corresponds to the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms an ionizing ionic compound with the boron or aluminum compound, e.g. triphenylchloromethane, or optionally a base, preferably an organic nitrogen-containing base, for example an amine, an aniline derivative or a nitrogen heterocycle. In addition, a fourth compound which likewise reacts with the boron or aluminum compound, e.g. pentafluorophenol, can be added.

Ionic compounds containing Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Compounds containing anionic boron heterocycles as are described in WO 97/36937 are also suitable as component C), in particular dimethylanilinium boratabenzene or trityl boratabenzene.

Preferred ionic compounds C) contain borates which bear at least two perfluorinated aryl radicals. Particular preference is given to N,N-dimethylanilinium tetrakis(pentafluorophenyl)borate and in particular N,N-dimethylcyclohexylammonium tetrakis(pentafluorophenyl)borate, N,N-dimethylbenzylammonium tetrakis(pentafluorophenyl)borate or trityl tetrakispentafluorophenylborate.

It is also possible for two or more borate anions to be joined to one another, as in the dianion $[(C_6F_5)_2B\text{—}C_6F_4\text{—}B(C_6F_5)_2]^{2-}$, or the borate anion can be bound to the support surface via a bridge having a suitable functional group.

Further suitable activating compounds C) are listed in WO 00/31090.

The amount of strong, uncharged Lewis acids, ionic compounds having Lewis-acid cations or ionic compounds containing Brönsted acids as cations is preferably from 0.1 to 20 equivalents, more preferably from 1 to 10 equivalents and particularly preferably from 1 to 2 equivalents, based on the biscyclopentadienyl complex A).

Suitable activating compounds C) also include boron-aluminum compounds such as di[bis(pentafluorophenyl)boroxy]methylalane. Examples of such boron-aluminum compounds are those disclosed in WO 99/06414.

It is also possible to use mixtures of all the abovementioned activating compounds C). Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane or a boroxin.

Both the biscyclopentadienyl complexes A) and the activating compounds C) are preferably used in a solvent, preferably an aromatic hydrocarbon having from 6 to 20 carbon atoms, in particular xylenes, toluene, pentane, hexane, heptane or a mixture thereof.

A further possibility is to use an activating compound C) which can simultaneously be employed as support Such systems are obtained, for example, from an inorganic oxide by treatment with zirconium alkoxide and subsequent chlorination, for example by means of carbon tetrachloride. The preparation of such systems is described, for example, in WO 01/41920.

For the transition metal compounds A) and, if used, the activating compounds C) to be employed in polymerization processes in a gas-phase fluidized-bed reactor, it is often advantageous, and preferred according to the present invention, to use them in the form of a solid, i.e. for them to be applied to a solid support B). The organic transition metal compounds A) are therefore, if desired, immobilized on an organic or inorganic support B) and introduced continuously or discontinuously in supported form into the gas-phase fluidized-bed reactor. This enables, for example, deposits in the reactor to be suppressed further or avoided and the polymer morphology to be controlled.

Particular preference is given to a catalyst system comprising a metallocene of the formula (Ib) and at least one activating compound C) and also a support component B).

To obtain such a supported catalyst system, the unsupported catalyst system A) can be reacted with a support B). The order in which the support B), the organic transition metal complex A) and the activating compound C) are combined is in principle immaterial. The organic transition metal complex A) and the activating compound C) can be fixed to the support independently of one another, e.g. in succession or simultaneously. Thus, the support B) can firstly be brought into contact with the activating compound or compounds C) or the support B) can firstly be brought into contact with the organic transition metal complex A). Preactivation of the organic transition metal complex A) using one or more activating compounds C) prior to mixing with the support B) is also possible. In a possible embodiment, the organic transition metal complex A) can also be prepared in the presence of the support B).

Immobilization is generally carried out in an inert solvent which is then filtered off or evaporated after immobilization has been carried out. After the individual process steps, the solid can be washed with suitable inert solvents such as aliphatic or aromatic hydrocarbons and then dried. The use of the still moist, supported catalyst is also possible.

In a preferred method of preparing the supported catalyst system, at least one organic transition metal complex A) is brought into contact with at least one activating compound C) in a suitable solvent, preferably giving a soluble reaction product, an adduct or a mixture. The preparation obtained in this way is then mixed with the dehydrated or passivated support B), the solvent is removed and the resulting supported organic transition metal complex catalyst system is dried to ensure that all or most of the solvent has been removed from the pores of the support material. The supported catalyst is obtained as a free-flowing powder. Examples of the industrial implementation of the above process are described in WO 96/00243, WO 98/40419 or WO 00/05277. A further preferred embodiment comprises firstly applying the activating compound C) to the support B) and subsequently bringing this supported compound into contact with the organic transition metal complex A). This second variant is particularly advantageous in the case of the unbridged metallocene complexes which are preferably used.

As support B), preference is given to using finely divided supports which can be any organic or inorganic solids. Suitable inorganic supports are oxides of metals of groups 2, 3, 4, 5, 13, 14, 15 and 16 of the Periodic Table of the Elements. Examples of oxides preferred as supports include silicon dioxide, aluminum oxide and also mixed oxides of the elements calcium, aluminum, silicon, magnesium or titanium and also corresponding oxide mixtures. Other inorganic oxides which can be used alone or in combination with the abovementioned preferred oxidic supports are, for example, MgO, CaO, $AlPO_4$, $ZrO_2$, $TiO_2$, $B_2O_3$ or mixtures thereof. As organic supports, it is possible to use finely divided polymer powders (e.g. a polyolefin or a polymer having polar functional groups).

The supports used preferably have a specific surface area in the range from 10 to 1000 $m^2/g$, a pore volume in the range from 0.1 to 5 ml/g and a mean particle diameter of from 1 to 500 μm. Preference is given to supports having a specific surface area in the range from 50 to 700 $m^2/g$, a pore volume in the range from 0.4 to 3.5 ml/g and a mean particle diameter in the range from 5 to 350 μm. Particular preference is given to supports having a specific surface area in the range from 200 to 550 $m^2/g$, a pore volume in the range from 0.5 to 3.0 ml/g and a mean particle diameter of from 10 to 150 μm, in particular 30-120 μm.

The supports can be subjected to a thermal treatment, e.g. to remove absorbed water, before use. Such a drying treatment is generally carried out at from 80 to 300° C., preferably from 100 to 200° C., with drying at from 100 to 200° C. preferably being carried out under reduced pressure and/or under a blanket of inert gas (e.g. nitrogen).

As an alternative, inorganic supports can be calcined at from 200 to 1000° C., if appropriate to set the desired structure of the solid and/or the desired OH concentration of the surface. Preference is given to calcination for from 3 to 24 hours at from 250° C. to 1000° C., in particular from 400° C. to 700° C. Simultaneously passing air or inert gas over the support or applying a vacuum is also possible. On heating, the inorganic supports firstly give off water, i.e. drying occurs. On further heating, viz. the actual calcination, the metal hydroxides are converted into the metal oxides with elimination of hydroxyl groups and interstitial anions. OH groups or interstitial anions such as carbonate can also continue to remain in the calcined inorganic supports. A measure of this is the loss on ignition. This is the weight loss experienced by a sample which is heated in two steps, viz. firstly for 30 minutes at 200° C. in a drying oven and then for one hour at 950° C. in a muffle furnace.

As inorganic support materials, preference is given to silica gel, magnesium chloride, aluminum oxide, mesoporous materials, aluminosilicates and hydrotalcites. Particular preference is given to using silica gel, since particles whose size and structure are suitable as supports for olefin polymerization can be produced from this material. Spray-dried silica gels, which are spherical agglomerates of smaller granular particles, i.e. primary particles, have been found to be particularly useful. The silica gels can be dried and/or calcined as described above before use.

The inorganic supports, in particular silica gels, are generally used as finely divided powders having a mean particle diameter $d_{50}$ of from 5 to 200 μm, preferably from 10 to 150 μm, particularly preferably from 15 to 100 μm and in particular from 20 to 70 μm, and usually have pore volumes of from 0.1 to 10 $cm^3/g$, preferably from 0.2 to 5 $cm^3/g$, and specific surface areas of from 30 to 1000 $m^2/g$, preferably from 50 to 800 $m^2/g$ and in particular from 100 to 600 $m^2/g$, most preferably from 240 to 450 $m^2/g$. Metallocenes are preferably applied in such an amount that the concentration of metallocenes in the finished catalyst system is from 5 to 200 μmol, preferably from 10 to 100 μmol and particularly preferably from 20 to 70 μmol, per g of support.

The inorganic supports can also be chemically modified. For example, the treatment of silica gel with $NH_4SiF_6$ or other fluorinating agents leads to fluorination of the silica gel surface, or treatment of silica gels with silanes containing nitrogen-, fluorine- or sulfur-containing groups leads to correspondingly modified silica gel surfaces.

Suitable organic supports are, for example, polyethylene, polypropylene or polystyrene, which are preferably likewise freed of adhering moisture, solvent residues or other impurities by appropriate purification and drying operations before use. It is also possible to use polymer supports bearing polar functional groups, e.g. ones based on polystyrene, polyethylene, polypropylene or polytetrafluoroethylene, via whose functional groups, for example ammonium or hydroxy groups, at least one of the catalyst components can be fixed. Here, particular mention may be made of copolymers of ethylene and acrylic esters, acrolein or vinyl acetate.

A further form of pretreatment is prepolymerization of the catalyst system with or without prior application to a support, with preference being given to prepolymerization of the supported catalyst system. The prepolymerization can be carried out continuously in a prepolymerization plant located upstream of the gas-phase fluidized-bed reactor. Batchwise prepolymerization independent of the operation of the reactor is also possible. The prepolymerization can in this case be carried out in the gas phase, in suspension or in the monomers (bulk).

The process of the present invention is illustrated below by examples of particularly preferred embodiments. It may be pointed out that the application to a support and the polymerization in each of the examples can also be combined in other ways.

EXAMPLES

A gas-phase fluidized-bed reactor was started up using metallocene catalysts. A circulated gas cyclone (CGC) which separates the fine particles carried from the reactor from the circulated gas is located downstream from the reactor. The catalyst used in each of the following examples is bis(1-methyl-3-butylcyclopentadienyl)zirconium dichloride/MAO supported on silica gel. An LLDPE product having a density of about 0.922 g/$Cm^3$ and a melt flow rate MFR (190° C./2.16 kg) of less than 4 g/10 min, determined in accordance with ISO 1133, is to be produced in long-term operation in each case. 1-Hexene was used as comonomer.

Example 1 a) Preparation of the Supported Catalyst 4 kg of silica gel (Grace Davison XPO2107, particle diameter about 70 μm) was calcined at 600° C. for six hours, subsequently suspended in 20 l of toluene and cooled to 10° C. 9.61 l of methylaluminoxane (MAO, Albemarle, 30% in toluene) were slowly added while stirring, with the temperature being kept below 12° C. A further 1.2 l of toluene were added and the temperature of the flask was increased to 25° C. The silica gel/MAO suspension was filtered, the solid was resuspended in 30 l of toluene, stirred for 15 minutes and filtered again. This purification step was repeated twice more.

The moist silica gel/MAO was suspended in 20 l of toluene at 25° C. 48.8 g of bis(1-methyl-3-butylcyclopentadienyl)

zirconium dichloride were dissolved in 0.75 l of toluene and added to the silica gel/MAO suspension while stirring. After the addition was complete, the mixture was stirred for another 2 hours. The suspension was filtered, the solid was resuspended in 20 l of toluene, filtered again and dried at 50° C. under reduced pressure to give a free-flowing catalyst powder.

The catalyst contained 24.3% by weight of volatile substances and had a bulk density of 453.3 g/l and an elemental composition of 10.5% by weight of aluminum, 25.5% by weight of silicon and 0.13% by weight of zirconium.

b) Polymerization

The polymerization was carried out in a reactor having an output of 50 kg/h of polyethylene. As can be seen from table 1, the reactor was started up at an MFR increased over that under production conditions over a start-up period of 15 hours by operating it at the beginning at an increased ratio of the flow of hydrogen to the flow of ethylene compared to long-term operation. A polymerization product having an MFR (190° C./2.16 kg) of above 15 g/10 min was produced at the beginning and the MFR was reduced to the desired value of below 4 g/10 min over a period of about 15 hours.

In addition, the reactor temperature was initially set to 97° C. and after the polymerization reaction had started (about 2 hours) was reduced to the production temperature of 95° C.

The start-up phase and the subsequent production operation were stable with a small amount of material being discharged from the circulated gas cyclone. The formation of lumps was not observed.

TABLE 1

| Time h | Reactor pressure bar | Reactor temp. °C. | Circulated gas m³/h | Nitrogen vol % | Ethene vol % | Hexane vol % | Hexene vol % | $H_2$ to reactor l/h | Ethene to reactor kg/h |
|---|---|---|---|---|---|---|---|---|---|
| 0 | 20.0 | 97.1 | 300 | 38.8 | 58.2 | 2.33 | 1.40 | 29.8 | 10.1 |
| 1 | 20.1 | 97.1 | 300 | 38.3 | 58.2 | 2.76 | 1.52 | 29.8 | 8.7 |
| 2 | 20.0 | 96.2 | 300 | 42.6 | 53.8 | 2.87 | 1.53 | 29.8 | 8.2 |
| 3 | 20.0 | 95.4 | 300 | 43.9 | 52.6 | 2.82 | 1.46 | 29.8 | 15.0 |
| 4 | 20.0 | 95.2 | 300 | 43.9 | 52.8 | 2.62 | 1.28 | 29.8 | 16.2 |
| 5 | 20.0 | 95.1 | 300 | 45.4 | 51.5 | 2.47 | 1.22 | 29.8 | 18.6 |
| 6 | 20.0 | 95.1 | 300 | 46.0 | 51.0 | 2.39 | 1.26 | 29.8 | 21.6 |
| 7 | 20.0 | 95.1 | 300 | 46.1 | 50.9 | 2.37 | 1.31 | 29.8 | 24.9 |
| 8 | 20.0 | 95.0 | 307 | 45.8 | 51.1 | 2.39 | 1.34 | 29.8 | 26.8 |
| 9 | 20.0 | 95.0 | 327 | 45.2 | 51.6 | 2.42 | 1.39 | 29.8 | 28.7 |
| 10 | 20.0 | 95.0 | 347 | 45.2 | 51.4 | 2.45 | 1.46 | 29.8 | 26.2 |
| 11 | 20.0 | 95.0 | 367 | 46.7 | 49.9 | 2.50 | 1.44 | 29.8 | 26.4 |
| 12 | 20.0 | 95.0 | 380 | 46.9 | 49.7 | 2.52 | 1.44 | 29.8 | 28.2 |
| 13 | 20.0 | 95.1 | 380 | 46.1 | 50.5 | 2.52 | 1.47 | 29.8 | 29.7 |
| 14 | 20.0 | 95.0 | 380 | 44.9 | 51.7 | 2.48 | 1.52 | 29.8 | 32.3 |
| 15 | 20.0 | 95.1 | 380 | 43.6 | 52.9 | 2.44 | 1.58 | 29.8 | 34.6 |
| 16 | 20.0 | 95.1 | 380 | 42.4 | 54.1 | 2.41 | 1.61 | 29.8 | 36.1 |
| 17 | 20.0 | 95.1 | 380 | 41.4 | 55.2 | 2.42 | 1.60 | 29.8 | 37.8 |
| 18 | 20.0 | 95.0 | 380 | 40.8 | 55.8 | 2.43 | 1.64 | 29.8 | 38.2 |
| 19 | 20.0 | 95.1 | 380 | 40.9 | 55.7 | 2.44 | 1.65 | 29.8 | 39.0 |
| 20 | 20.0 | 95.0 | 380 | 41.2 | 55.4 | 2.44 | 1.65 | 29.8 | 39.1 |
| 21 | 20.0 | 95.0 | 380 | 41.7 | 54.9 | 2.47 | 1.63 | 29.8 | 39.5 |
| 22 | 20.0 | 95.0 | 380 | 42.3 | 54.3 | 2.51 | 1.60 | 29.8 | 40.2 |
| 23 | 20.0 | 95.0 | 380 | 43.0 | 53.6 | 2.54 | 1.57 | 29.8 | 41.0 |
| 24 | 20.0 | 95.0 | 380 | 44.7 | 52.0 | 2.52 | 1.52 | 29.8 | 40.4 |
| 25 | 20.0 | 95.0 | 380 | 46.2 | 50.5 | 2.54 | 1.46 | 29.8 | 41.2 |
| 26 | 20.0 | 95.0 | 380 | 46.8 | 50.0 | 2.48 | 1.45 | 29.0 | 40.7 |
| 27 | 20.0 | 95.0 | 380 | 46.7 | 50.1 | 2.50 | 1.45 | 27.8 | 41.4 |
| 28 | 20.0 | 95.0 | 380 | 46.3 | 50.5 | 2.47 | 1.51 | 27.8 | 41.6 |
| 29 | 20.0 | 95.0 | 380 | 45.8 | 50.8 | 2.47 | 1.55 | 27.8 | 42.5 |
| 30 | 20.0 | 95.0 | 380 | 45.1 | 51.4 | 2.47 | 1.60 | 27.8 | 44.4 |
| 31 | 20.0 | 95.0 | 380 | 44.1 | 52.4 | 2.47 | 1.61 | 27.8 | 45.2 |
| 32 | 20.0 | 95.0 | 380 | 43.3 | 53.2 | 2.44 | 1.66 | 27.8 | 46.1 |
| 33 | 20.0 | 95.0 | 380 | 42.4 | 54.0 | 2.47 | 1.67 | 27.8 | 46.6 |
| 34 | 20.0 | 95.0 | 380 | 41.9 | 54.4 | 2.45 | 1.70 | 27.8 | 46.9 |
| 35 | 20.0 | 95.0 | 380 | 41.4 | 54.9 | 2.47 | 1.72 | 27.8 | 47.9 |
| 36 | 20.0 | 95.0 | 380 | 41.1 | 55.3 | 2.48 | 1.73 | 27.8 | 48.2 |
| 37 | 20.0 | 95.0 | 380 | 40.8 | 55.5 | 2.48 | 1.74 | 27.8 | 47.8 |
| 38 | 20.0 | 95.0 | 380 | 40.8 | 55.6 | 2.51 | 1.74 | 27.8 | 48.7 |
| 39 | 20.0 | 95.0 | 380 | 40.8 | 55.5 | 2.48 | 1.75 | 29.6 | 48.4 |

| Time h | Hexene to reactor kg/h | Offgas from reactor kg/h | Catalyst g/h | Fines g/3 h | Lumps g/h | MFR g/10 min | Density g/cm³ | Bulk density g/l |
|---|---|---|---|---|---|---|---|---|
| 0 | 1.10 | 15.00 | 12.57 | 8 | | | | |
| 1 | 0.92 | 14.89 | 6.58 | | | | | |
| 2 | 0.88 | 12.06 | 5.68 | | | | | |
| 3 | 0.93 | 10.02 | 6.28 | 3 | | | | |
| 4 | 1.33 | 10.01 | 6.58 | | | | | |
| 5 | 1.82 | 10.00 | 6.88 | | | | | |
| 6 | 2.24 | 10.00 | 7.18 | 1 | | | | |
| 7 | 2.52 | 9.99 | 7.78 | | | 15.6 | 0.9202 | 465 |
| 8 | 2.72 | 10.00 | .,78 | | | | | |
| 9 | 3.12 | 9.68 | 8.08 | 2 | | 11.1 | 0.9224 | 450 |
| 10 | 2.88 | 6.54 | 8.08 | | | | | |

TABLE 1-continued

| | | | | | | | |
|---|---|---|---|---|---|---|---|
| 11 | 2.90 | 5.98 | 8.68 | | 9.72 | 0.9202 | 480 |
| 12 | 3.10 | 5.99 | 8.68 | 8 | | | |
| 13 | 3.27 | 5.99 | 9.27 | | 8.60 | 0.9201 | 485 |
| 14 | 3.54 | 5.97 | 9.27 | | | | |
| 15 | 3.79 | 5.98 | 9.87 | 13 | 7.59 | 0.9199 | 496 |
| 16 | 3.94 | 6.00 | 10.17 | | | | |
| 17 | 4.15 | 5.98 | 10.47 | | 5.72 | 0.9196 | 499 |
| 18 | 4.20 | 6.00 | 10.77 | 25 | | | |
| 19 | 4.29 | 6.01 | 11.07 | | 5.34 | 0.9191 | 495 |
| 20 | 4.30 | 5.99 | 11.67 | | | | |
| 21 | 4.35 | 6.00 | 11.97 | 23 | 4.55 | 0.9192 | 502 |
| 22 | 4.42 | 6.01 | 12.27 | | | | |
| 23 | 4.51 | 5.99 | 13.46 | | 4.31 | 0.9191 | 506 |
| 24 | 4.44 | 6.01 | 14.06 | 40 | | | |
| 25 | 4.53 | 6.01 | 14.66 | | 4.40 | 0.9192 | 440 |
| 26 | 4.48 | 6.01 | 14.66 | | | | |
| 27 | 4.60 | 6.01 | 14.36 | 46 | 4.49 | 0.9191 | 504 |
| 28 | 4.98 | 5.98 | 14.66 | | | | |
| 29 | 5.09 | 5.99 | 14.66 | | 4.10 | 0.9191 | 504 |
| 30 | 5.30 | 5.99 | 14.66 | 48 | | | |
| 31 | 5.41 | 5.98 | 14.36 | | 3.85 | 0.9186 | 497 |
| 32 | 5.52 | 6.03 | 14.66 | | | | |
| 33 | 5.56 | 5.95 | 14.66 | 55 | 3.59 | 0.9188 | 512 |
| 34 | 5.62 | 5.95 | 14.36 | | | | |
| 35 | 5.75 | 5.98 | 14.66 | | 3.43 | 0.9187 | 510 |
| 36 | 5.77 | 5.99 | 14.66 | 51 | | | |
| 37 | 5.74 | 6.01 | 14.36 | | 3.18 | 0.9187 | 514 |
| 38 | 5.84 | 5.98 | 14.66 | | | | |
| 39 | 5.80 | 5.98 | 14.66 | 57 | 3.27 | 0.9187 | 506 |

Comparative Example 1 a) Preparation of the Supported Catalyst 105.4 g of bis(1-methyl-3-butylcyclopentadienyl)zirconium dichloride were dissolved in 6.4 l of methylaluminoxane (MAO, Albemarle, 30% in toluene) and the mixture was stirred for one hour at room temperature. The solution was added slowly while stirring to 4.5 kg of silica gel (Ineos ES70X), which had previously been calcined at 600° C. for 6 hours, with the temperature being kept below 40° C. After the addition was complete, 0.5 l of toluene was added to rinse out the flask containing the MAO/bis(1-methyl-3-butylcyclopentadienyl)zirconium dichloride solution. The catalyst was dried under reduced pressure to give a free-flowing powder.

The catalyst contained 31% by weight of volatile substances and had an elemental composition of 8.3% by weight of aluminum and 0.21% by weight of zirconium.

b) Polymerization

The polymerization was carried out in a reactor having an output of 6.5 kg/h of polyethylene. As can be seen from table 2, a polymerization product having an MFR (190° C./2.16 kg) of below 4 g/10 min was produced in the reactor from the beginning by introducing a significantly smaller, compared to example 1, hydrogen flow relative to ethylene into the reactor.

After only one hour of operation, lumps were evident in the reactor and finally led, after about 21 hours, to shutdown of the reactor since the product discharge opening had become blocked.

TABLE 2

| Time h | Reactor pressure bar | Reactor temp. ° C. | Circulated gas m$^3$/h | Nitrogen vol % | Ethene vol % | Hexane vol % | Hexene vol % | H$_2$ to reactor l/h | Ethene to reactor kg/h |
|---|---|---|---|---|---|---|---|---|---|
| 0 | 20.0 | 95.0 | 38 | 41.9 | 54.8 | 2.97 | 1.37 | 0.49 | 1.1 |
| 1 | 20.0 | 95.0 | 38 | 41.2 | 55.2 | 3.18 | 1.41 | 0.49 | 1.1 |
| 2 | 20.0 | 95.0 | 38 | 41.2 | 55.3 | 3.08 | 1.42 | 0.49 | 1.1 |
| 3 | 20.0 | 95.0 | 38 | 41.6 | 55.0 | 3.01 | 1.41 | 0.49 | 1.1 |
| 4 | 20.0 | 94.9 | 38 | 41.2 | 55.4 | 2.98 | 1.39 | 0.49 | 1.2 |
| 5 | 20.0 | 95.0 | 38 | 39.5 | 57.1 | 3.00 | 1.43 | 0.49 | 1.1 |
| 6 | 20.0 | 95.0 | 38 | 39.9 | 56.7 | 3.00 | 1.43 | 0.49 | 0.9 |
| 7 | 20.0 | 95.1 | 38 | 42.2 | 54.5 | 2.98 | 1.41 | 0.49 | 0.8 |
| 8 | 20.0 | 95.0 | 38 | 45.8 | 51.1 | 3.00 | 1.35 | 0.49 | 1.1 |
| 9 | 20.0 | 95.1 | 38 | 45.2 | 51.6 | 3.01 | 1.31 | 0.49 | 1.5 |
| 10 | 20.0 | 95.1 | 38 | 42.9 | 54.0 | 2.96 | 1.29 | 0.49 | 1.8 |
| 11 | 20.0 | 95.1 | 38 | 41.1 | 55.8 | 2.96 | 1.28 | 0.49 | 2.1 |
| 12 | 20.0 | 95.1 | 38 | 40.8 | 56.1 | 2.96 | 1.24 | 0.49 | 2.4 |
| 13 | 20.0 | 95.1 | 38 | 41.1 | 55.8 | 3.00 | 1.22 | 0.49 | 2.8 |
| 14 | 20.0 | 95.1 | 38 | 41.7 | 55.1 | 3.01 | 1.25 | 0.49 | 3.1 |
| 15 | 20.0 | 95.1 | 39 | 42.0 | 54.9 | 2.94 | 1.30 | 0.49 | 3.4 |
| 16 | 20.0 | 95.1 | 41 | 42.0 | 54.8 | 2.97 | 1.32 | 0.49 | 3.7 |
| 17 | 20.0 | 95.1 | 41 | 42.3 | 54.5 | 2.98 | 1.30 | 0.49 | 4.1 |
| 18 | 20.0 | 95.2 | 41 | 42.3 | 54.5 | 2.95 | 1.28 | 0.49 | 4.3 |
| 19 | 19.9 | 95.3 | 41 | 43.9 | 53.0 | 2.94 | 1.23 | 0.49 | 5.0 |

TABLE 2-continued

| | | | | | | | | | |
|---|---|---|---|---|---|---|---|---|---|
| 20 | 20.1 | 95.1 | 41 | 42.4 | 54.5 | 2.92 | 1.24 | 0.49 | 4.5 |
| 21 | 18.8 | 83.9 | 34 | 43.8 | 51.7 | 2.92 | 1.38 | 0.13 | 1.3 |
| 22 | 1.2 | 60.6 | 3 | 38.0 | 13.8 | 3.10 | 1.29 | | |
| 23 | | 60.0 | | 2.33 | 0.03 | 4.21 | 1.64 | | |

| Time h | Hexene to reactor kg/h | Offgas from reactor kg/h | Catalyst g/h | Fines from CGC g/3 h | Lumps g/h | MFR g/10 min | Density g/cm³ | Bulk density g/l |
|---|---|---|---|---|---|---|---|---|
| 0 | 105.5 | 1.2 | 1.03 | | | | | |
| 1 | 102.1 | 1.2 | 0.95 | 6 | | | | |
| 2 | 96.8 | 1.2 | 0.95 | | | | | |
| 3 | 94.8 | 1.2 | 0.95 | | | | | |
| 4 | 97.2 | 1.2 | 0.27 | 6 | | | | |
| 5 | 91.1 | 1.2 | 0.11 | | | | | |
| 6 | 83.8 | 1.2 | 0.11 | | | | | |
| 7 | 81.4 | 1.2 | 0.71 | 5 | | | | |
| 8 | 92.9 | 1.2 | 0.95 | | | | | |
| 9 | 112.5 | 1.2 | 1.01 | | | | | |
| 10 | 134.6 | 1.2 | 1.05 | 2 | | | | |
| 11 | 158.2 | 1.2 | 1.11 | | 15 | | | |
| 12 | 188.9 | 1.2 | 1.18 | | 6 | | | |
| 13 | 225.5 | 1.2 | 1.16 | 1 | 9 | | | |
| 14 | 281.3 | 1.2 | 1.16 | | 6 | | | |
| 15 | 309.6 | 1.2 | 1.18 | | 8 | | | |
| 16 | 323.4 | 1.2 | 1.24 | 10 | 8 | | | |
| 17 | 341.5 | 1.2 | 1.24 | | 8 | | | |
| 18 | 357.4 | 1.1 | 1.34 | | 11 | 2.58 | 0.9211 | 384 |
| 19 | 420.1 | 0.8 | 1.37 | 68 | 15 | | | |
| 20 | 469.1 | 0.7 | 0.86 | 38 | 12 | 1.94 | 0.9210 | 408 |
| 21 | 162.9 | 1.9 | | | | | | |
| 22 | 0.0 | 0.4 | | | | | | |
| 23 | 0.0 | | | | | | | |

Example 2 a) Preparation of the Supported Catalyst 4 kg of silica gel (Grace Davison XPO2107) was calcined at 600° C. for six hours, subsequently suspended in 20 l of toluene and cooled to 10° C. 9.61 l of methylaluminoxane (MAO, Albemarle, 30% in toluene) were slowly added while stirring, with the temperature being kept below 12° C. A further 1.2 l of toluene were added and the temperature of the flask was increased to 25° C. The silica gel-MAO suspension was filtered, the solid was resuspended in 30 l of toluene, stirred for 15 minutes and filtered again. This purification step was repeated twice more.

The moist silica gel/MAO was suspended in 20 l of toluene at 25° C. 48.8 g of bis(1-methyl-3-butylcyclopentadienyl) zirconium dichloride were dissolved in 0.75 l of toluene and added to the silica gel/MAO suspension while stirring. After the addition was complete, the mixture was stirred for another 2 hours. The suspension was filtered, the solid was resuspended in 20 l of toluene, filtered again and dried at 50° C. under reduced pressure to give a free-flowing catalyst powder.

The catalyst contained 24.3% by weight of volatile substances and had a bulk density of 453.3 g/l and an elemental composition of 10.5% by weight of aluminum, 25.5% by weight of silicon and 0.13% by weight of zirconium.

b) Polymerization

The polymerization was carried out in a reactor having an output of 50 kg/h of polyethylene. As can be seen from table 3, the reactor was started up at an MFR increased over that under production conditions over a start-up period of 25 hours by commencing with a high proportion of hydrogen. A polymerization product having an MFR (190° C./2.16 kg) of above 8 g/10 min was produced at the beginning and the MFR was reduced to the desired value of below 4 g/10 min over a period of about 25 hours.

In addition, the reactor temperature was initially set to 97° C. and after the polymerization reaction had started (about 2 hours) was reduced to the long-term operation temperature of 95° C.

The start-up phase and the subsequent production operation were stable with low formation of fine particles. The formation of lumps was not observed.

TABLE 3

| Time h | Reactor pressure bar | Reactor temp. ° C. | Circulated gas m³/h | Nitrogen vol % | Ethene vol % | Hexane vol % | Hexene vol % | H₂ to reactor l/h | Ethene to reactor kg/h |
|---|---|---|---|---|---|---|---|---|---|
| 0 | 20.0 | 97.1 | 300. | 40.0 | 56.8 | 2.76 | 1.64 | 29.8 | 14.4 |
| 1 | 20.0 | 96.9 | 300. | 35.7 | 61.4 | 2.56 | 1.55 | 29.8 | 11.8 |
| 2 | 20.0 | 95.9 | 311. | 37.4 | 59.9 | 2.47 | 1.40 | 29.8 | 15.2 |
| 3 | 20.0 | 95.2 | 320. | 38.1 | 59.3 | 2.43 | 1.36 | 29.8 | 19.3 |
| 4 | 20.0 | 95.2 | 320. | 39.6 | 57.8 | 2.47 | 1.36 | 29.8 | 23.9 |
| 5 | 20.0 | 95.1 | 329. | 41.0 | 56.4 | 2.44 | 1.36 | 29.8 | 26.8 |
| 6 | 20.0 | 95.1 | 340. | 42.5 | 54.9 | 2.37 | 1.47 | 29.8 | 29.5 |
| 7 | 20.0 | 95.0 | 354. | 44.4 | 53.0 | 2.25 | 1.51 | 29.8 | 27.5 |

TABLE 3-continued

| | | | | | | | | | |
|---|---|---|---|---|---|---|---|---|---|
| 8 | 20.0 | 95.1 | 371. | 47.1 | 50.5 | 2.21 | 1.49 | 29.8 | 32.4 |
| 9 | 20.0 | 95.1 | 380. | 46.5 | 51.2 | 2.04 | 1.52 | 29.8 | 36.1 |
| 10 | 20.0 | 95.1 | 380. | 44.9 | 52.8 | 1.92 | 1.58 | 29.8 | 38.4 |
| 11 | 20.0 | 95.1 | 380. | 43.6 | 54.2 | 1.86 | 1.64 | 29.8 | 42.0 |
| 12 | 20.0 | 95.0 | 380. | 42.6 | 55.1 | 1.87 | 1.70 | 29.8 | 42.9 |
| 13 | 20.0 | 95.1 | 380. | 42.0 | 55.7 | 1.89 | 1.72 | 29.8 | 45.1 |
| 14 | 20.0 | 95.0 | 380. | 41.7 | 55.9 | 1.92 | 1.76 | 29.8 | 45.5 |
| 15 | 20.0 | 95.1 | 380. | 42.2 | 55.4 | 1.92 | 1.77 | 34.4 | 45.6 |
| 16 | 20.0 | 95.0 | 380. | 42.7 | 54.8 | 1.94 | 1.77 | 38.4 | 47.5 |
| 17 | 20.0 | 95.0 | 380. | 42.8 | 54.7 | 1.94 | 1.77 | 35.4 | 46.7 |
| 18 | 20.0 | 95.1 | 380. | 43.0 | 54.6 | 1.99 | 1.76 | 33.4 | 46.9 |
| 19 | 20.0 | 95.0 | 380. | 43.1 | 54.4 | 2.02 | 1.76 | 33.3 | 47.6 |
| 20 | 20.0 | 95.0 | 380. | 43.2 | 54.3 | 1.99 | 1.75 | 33.3 | 47.9 |
| 21 | 20.0 | 94.9 | 380. | 43.2 | 54.3 | 2.02 | 1.74 | 29.9 | 46.4 |
| 22 | 20.0 | 95.1 | 380. | 43.2 | 54.3 | 2.01 | 1.79 | 29.4 | 46.8 |
| 23 | 20.0 | 95.0 | 380. | 43.2 | 54.3 | 2.02 | 1.77 | 29.7 | 47.8 |
| 24 | 20.0 | 95.0 | 380. | 43.2 | 54.4 | 1.98 | 1.76 | 29.4 | 46.7 |
| 25 | 20.0 | 95.0 | 380. | 43.2 | 54.4 | 1.96 | 1.68 | 28.8 | 45.6 |
| 26 | 20.0 | 95.0 | 380. | 43.2 | 54.3 | 1.93 | 1.65 | 28.7 | 45.4 |
| 27 | 20.0 | 95.0 | 380. | 43.3 | 54.2 | 2.00 | 1.67 | 29.0 | 45.9 |
| 28 | 20.0 | 95.0 | 380. | 43.2 | 54.3 | 2.02 | 1.66 | 28.7 | 45.4 |
| 29 | 20.0 | 95.0 | 380. | 43.2 | 54.3 | 2.04 | 1.65 | 28.9 | 45.8 |
| 30 | 20.0 | 95.0 | 380. | 43.1 | 54.3 | 2.07 | 1.67 | 28.7 | 45.5 |
| 31 | 20.0 | 95.0 | 380. | 43.1 | 54.4 | 1.98 | 1.70 | 28.6 | 45.4 |
| 32 | 20.0 | 95.0 | 380. | 43.4 | 54.0 | 1.98 | 1.67 | 28.8 | 45.7 |
| 33 | 20.0 | 95.0 | 380. | 43.5 | 54.0 | 1.94 | 1.69 | 28.6 | 45.3 |
| 34 | 20.0 | 95.0 | 380. | 43.2 | 54.3 | 1.87 | 1.65 | 29.4 | 46.7 |
| 35 | 20.0 | 95.0 | 380. | 42.9 | 54.7 | 1.90 | 1.65 | 29.4 | 46.7 |
| 36 | 20.0 | 95.0 | 380. | 42.6 | 54.9 | 1.94 | 1.60 | 29.3 | 46.6 |
| 37 | 20.0 | 95.0 | 380. | 42.3 | 55.2 | 2.07 | 1.65 | 29.2 | 46.7 |

| Time h | Hexene to reactor kg/h | Offgas from reactor kg/h | Catalyst g/h | Fines from CGC g/3 h | Lumps g/h | MFR g/10 min | Density g/cm$^3$ | Bulk density g/l |
|---|---|---|---|---|---|---|---|---|
| 0 | 0.70 | 15.00 | 12.57 | | | | | |
| 1 | 0.62 | 13.48 | 5.98 | 3 | | | | |
| 2 | 1.04 | 10.18 | 5.68 | | | | | |
| 3 | 1.74 | 10.00 | 5.98 | | | | | |
| 4 | 2.07 | 10.01 | 6.58 | 2 | | | | |
| 5 | 2.65 | 10.00 | 7.18 | | | | | |
| 6 | 3.22 | 9.87 | 7.78 | | | | | |
| 7 | 3.03 | 6.30 | 8.98 | 1 | | 8.69 | | 458 |
| 8 | 3.56 | 5.97 | 9.57 | | | | | |
| 9 | 3.94 | 5.98 | 9.87 | | | 8.8 | 0.9227 | 470 |
| 10 | 4.17 | 5.98 | 10.17 | 5 | | | | |
| 11 | 4.62 | 5.98 | 10.77 | | | 7.3 | 0.9223 | 485 |
| 12 | 4.73 | 5.98 | 11.07 | | | | | |
| 13 | 4.93 | 5.99 | 11.37 | 13 | | 3.1 | 0.9221 | 490 |
| 14 | 5.01 | 5.99 | 11.37 | | | | | |
| 15 | 5.01 | 5.99 | 11.37 | | | 5.6 | 0.9205 | 500 |
| 16 | 5.24 | 5.99 | 11.37 | 20 | | | | |
| 17 | 5.14 | 5.99 | 11.67 | | | 5.1 | 0.9203 | 504 |
| 18 | 5.17 | 5.99 | 12.27 | | | | | |
| 19 | 5.25 | 5.99 | 12.27 | 5 | | 6.4 | 0.9194 | 501 |
| 20 | 5.27 | 5.99 | 12.27 | | | | | |
| 21 | 5.12 | 5.98 | 12.27 | | | 6.3 | 0.9201 | 509 |
| 22 | 5.14 | 5.99 | 12.27 | 16 | | | | |
| 23 | 5.27 | 6.01 | 11.97 | | | 5.84 | 0.9183 | 500 |
| 24 | 5.14 | 6.01 | 11.37 | | | | | |
| 25 | 5.02 | 5.99 | 11.67 | 27 | | 4.42 | 0.9194 | 502 |
| 26 | 5.00 | 6.00 | 11.67 | | | | | |
| 27 | 5.05 | 6.01 | 11.67 | | | 3.94 | 0.9195 | 497 |
| 28 | 5.00 | 6.00 | 11.67 | 39 | 7 | | | |
| 29 | 5.04 | 6.03 | 11.67 | | | 3.92 | 0.9181 | 495 |
| 30 | 5.00 | 5.98 | 11.67 | | | | | |
| 31 | 5.00 | 5.96 | 11.67 | 50 | | 3.79 | 0.9193 | 501 |
| 32 | 5.03 | 5.99 | 11.97 | | | | | |
| 33 | 4.99 | 5.99 | 11.67 | | | 3.71 | 0.9192 | 501 |
| 34 | 5.15 | 5.99 | 11.67 | 66 | | | | |
| 35 | 5.14 | 6.00 | 11.67 | | | 3.75 | 0.9186 | 492 |
| 36 | 5.14 | 6.00 | 11.67 | | | | | |
| 37 | 5.14 | 6.01 | 11.67 | 76 | | 3.68 | 0.9187 | 497 |

Example 3 a) Preparation of the Supported Catalyst 4 kg of silica gel (Grace Davison XPO2408, particle diameter about 45 μm) was calcined at 600° C. for six hours, subsequently suspended in 20 l of toluene and cooled to 10° C. 9.61 l of methylaluminoxane (MAO, Albemarle, 30% in toluene) were slowly added while stirring, with the temperature being kept below 12° C. A further 1.2 l of toluene were added and the temperature of the flask was increased to 25° C. The silica gel/MAO suspension was filtered, the solid was resuspended in 30 l of toluene, stirred for 15 minutes and filtered again. This purification step was repeated twice more.

The moist silica gel/MAO was suspended in 20 l of toluene at 25° C. 60.5 g of bis(1-methyl-3-butylcyclopentadienyl)zirconium dichloride were dissolved in 0.75 l of toluene and added to the silica gel/MAO suspension while stirring. After the addition was complete, the mixture was stirred for another 2 hours. The suspension was filtered, the solid was resuspended in 20 l of toluene, filtered again and dried at 50° C. under reduced pressure to give a free-flowing catalyst powder.

The catalyst contained 5.3% by weight of volatile substances and had a bulk density of 343.2 g/l and an elemental composition of 12.6% by weight of aluminum, 31% by weight of silicon and 0.24% by weight of zirconium.

b) Polymerization

The polymerization was carried out in a reactor having an output of 50 kg/h of polyethylene. As can be seen from table 4, the reactor was started up at an MFR increased over that under production conditions over a start-up period of 15 hours by commencing with a high proportion of hydrogen. A polymerization product having an MFR (190° C./2.16 kg) of about 8 g/10 min was produced at the beginning and the MFR was reduced to the desired value of below 4 g/10 min over a period of about 15 hours.

The start-up phase and the subsequent production operation were stable with low formation of fine particles. Only small amounts of lumps in the start-up phase were formed.

TABLE 4

| Time h | Reactor pressure bar | Reactor temp. ° C. | Circulated gas m³/h | Nitrogen vol % | Ethene vol % | Hexane vol % | Hexene vol % | $H_2$ to reactor l/h | Ethene to reactor kg/h |
|---|---|---|---|---|---|---|---|---|---|
| 0 | 20.0 | 95.6 | 340.0 | 51.3 | 45.4 | 2.39 | 1.29 | 29.8 | 29.2 |
| 1 | 20.0 | 95.6 | 343.7 | 52.1 | 44.6 | 2.40 | 1.30 | 29.8 | 29.2 |
| 2 | 20.0 | 95.4 | 363.0 | 54.8 | 41.9 | 2.46 | 1.23 | 29.8 | 25.2 |
| 3 | 20.0 | 95.5 | 378.5 | 58.1 | 38.5 | 2.55 | 1.14 | 29.8 | 26.6 |
| 4 | 20.0 | 95.5 | 380.0 | 59.1 | 37.5 | 2.54 | 1.06 | 29.8 | 27.8 |
| 5 | 20.0 | 95.5 | 380.0 | 58.9 | 37.6 | 2.51 | 1.06 | 29.8 | 29.5 |
| 6 | 20.0 | 95.5 | 380.0 | 58.5 | 38.1 | 2.47 | 1.09 | 29.8 | 30.1 |
| 7 | 20.0 | 95.6 | 380.0 | 58.1 | 38.4 | 2.46 | 1.11 | 29.8 | 31.0 |
| 8 | 20.0 | 95.5 | 380.0 | 57.7 | 38.9 | 2.46 | 1.13 | 29.8 | 32.4 |
| 9 | 20.0 | 95.5 | 380.0 | 57.4 | 39.2 | 2.46 | 1.14 | 29.8 | 33.0 |
| 10 | 20.0 | 95.5 | 380.0 | 57.0 | 39.5 | 2.46 | 1.15 | 22.7 | 32.6 |
| 11 | 20.0 | 95.6 | 380.0 | 56.9 | 39.6 | 2.48 | 1.16 | 23.0 | 34.1 |
| 12 | 20.0 | 95.6 | 380.0 | 56.8 | 39.8 | 2.49 | 1.16 | 23.7 | 35.2 |
| 10 | 20.0 | 95.5 | 380.0 | 57.0 | 39.5 | 2.46 | 1.15 | 22.7 | 32.6 |
| 11 | 20.0 | 95.6 | 380.0 | 56.9 | 39.6 | 2.48 | 1.16 | 23.0 | 34.1 |
| 12 | 20.0 | 95.6 | 380.0 | 56.8 | 39.8 | 2.49 | 1.16 | 23.7 | 35.2 |
| 13 | 20.0 | 95.5 | 380.0 | 56.9 | 39.7 | 2.48 | 1.16 | 24.0 | 35.6 |
| 14 | 20.0 | 95.5 | 380.0 | 57.0 | 39.6 | 2.48 | 1.15 | 24.3 | 36.0 |
| 15 | 20.0 | 95.5 | 380.0 | 57.1 | 39.6 | 2.49 | 1.14 | 24.4 | 36.2 |
| 16 | 20.0 | 95.5 | 380.0 | 57.5 | 39.2 | 2.52 | 1.13 | 24.0 | 35.6 |
| 17 | 20.0 | 95.5 | 380.0 | 57.8 | 38.9 | 2.53 | 1.13 | 24.0 | 35.6 |
| 18 | 20.0 | 95.5 | 380.0 | 57.9 | 38.8 | 2.54 | 1.12 | 25.0 | 37.0 |
| 19 | 20.0 | 95.5 | 380.0 | 58.1 | 38.5 | 2.52 | 1.12 | 25.2 | 37.3 |
| 20 | 20.0 | 95.5 | 380.0 | 58.3 | 38.3 | 2.48 | 1.12 | 25.6 | 37.9 |
| 21 | 20.0 | 95.5 | 380.0 | 58.2 | 38.4 | 2.46 | 1.13 | 26.0 | 38.5 |
| 22 | 20.0 | 95.6 | 380.0 | 58.2 | 38.4 | 2.46 | 1.14 | 26.6 | 39.3 |
| 23 | 20.0 | 95.5 | 380.0 | 57.9 | 38.6 | 2.47 | 1.13 | 27.2 | 40.3 |

| Time h | Hexene to reactor kg/h | Offgas from reactor kg/h | Catalyst g/h | Fines from CGC g/3 h | Lumps g/h | MFR g/10 min | Density g/cm³ | Bulk density g/l |
|---|---|---|---|---|---|---|---|---|
| 0 | 3.21 | 9.99 | 8.15 | | | | | |
| 1 | 3.22 | 9.34 | 8.83 | | 3 | 8.0 | 0.9203 | 463 |
| 2 | 2.77 | 6.10 | 9.51 | 15 | | | | |
| 3 | 2.92 | 5.99 | 10.19 | | | 7.9 | 0.9206 | 473 |
| 4 | 3.06 | 5.98 | 10.87 | | | | | |
| 5 | 3.25 | 5.99 | 10.87 | 3 | | 7.5 | 0.9203 | 491 |
| 6 | 3.31 | 6.01 | 10.87 | | | | | |
| 7 | 3.41 | 6.01 | 11.10 | | 4 | 6.9 | 0.9206 | 500 |
| 8 | 3.55 | 6.01 | 11.55 | 4 | | | | |
| 9 | 3.63 | 6.01 | 11.78 | | 1 | 6.1 | 0.9198 | 507 |
| 10 | 3.55 | 6.01 | 12.46 | | | | | |
| 11 | 3.71 | 6.02 | 12.46 | 5 | 1 | 5.1 | 0.9196 | 490 |
| 12 | 3.83 | 5.97 | 13.36 | | | | | |
| 10 | 3.55 | 6.01 | 12.46 | | | | | |
| 11 | 3.71 | 6.02 | 12.46 | 5 | 1 | 5.1 | 0.9196 | 490 |
| 12 | 3.83 | 5.97 | 13.36 | | | | | |
| 13 | 3.88 | 6.01 | 13.59 | | | 4.4 | 0.9191 | 500 |

TABLE 4-continued

| | | | | | | | | |
|---|---|---|---|---|---|---|---|---|
| 14 | 3.93 | 5.97 | 13.59 | 18 | 1 | | | |
| 15 | 3.95 | 6.01 | 13.59 | | | 3.8 | 0.9187 | 518 |
| 16 | 3.88 | 6.01 | 13.59 | | | | | |
| 17 | 3.88 | 6.02 | 14.27 | 29 | | 3.6 | 0.9190 | 513 |
| 18 | 4.03 | 5.96 | 14.72 | | | | | |
| 19 | 4.06 | 5.98 | 14.95 | | | 3.7 | 0.9191 | 516 |
| 20 | 4.13 | 5.99 | 14.95 | 73 | | | | |
| 21 | 4.19 | 6.01 | 15.40 | | | 3.7 | 0.9188 | 517 |
| 22 | 4.29 | 5.99 | 15.63 | | | | | |
| 23 | 4.39 | 5.98 | 16.08 | 58 | | 3.6 | 0.9186 | 510 |

We claim:

1. A process for an olefin polymerization comprising (a) starting up the polymerization reaction in a gas-phase fluidized-bed reactor using a catalyst comprising a metallocene to produce a start-up polyolefin having a melt flow rate greater than 4.5 g/10 min; and (b) continuing the polymerization reaction and gradually decreasing the melt flow rate of the polyolefin to less than 4 g/10 min, wherein the melt flow rate is measured at 2.16 kg and 190° C. in accordance with ISO 1133, and wherein said start-up phase of step (a) has a duration of 30 minutes to 30 hours.

2. The process of claim 1, wherein the start-up phase of step (a) has a duration of 2 hours to 20 hours.

3. The process of claim 1, wherein the reaction temperature in step (a) is at least 1° C. higher than the reaction temperature in step (b).

4. The process of claim 3, wherein the reaction temperature in step (a) is 1.5 to 4° C. higher than the reaction temperature in step (b).

5. The process as claimed in claim 3, wherein the reaction temperature in step (b) is in a range bounded by an upper limit given by equation I $$T_{RH} = 170 + \frac{6d'}{0.84 - d'} \quad (I)$$

and a lower limit given by equation II $$T_{RN} = 173 + \frac{7.3d'}{0.837 - d'} \quad (II)$$

wherein, $T_{RH}$ is a maximum reaction temperature in ° C.

$T_{RN}$ is a minimum reaction temperature in ° C.

d' is a value of a density of the polymer to be produced.

6. The process of claim 1, wherein the melt flow rate is regulated by hydrogen concentration in the reactor.

7. The process of claim 1, wherein the melt flow rate is regulated by a monomer partial pressure in the reactor.

8. The process of claim 1, wherein the polyolefin is a homopolymer or copolymer of ethylene.

9. A process for an olefin polymerization comprising (a) starting up the polymerization reaction in a gas-phase fluidized-bed reactor using a catalyst comprising a metallocene to produce a start-up polyolefin having a melt flow rate greater than 4.5 g/10 min; and (b) continuing the polymerization reaction and gradually decreasing the melt flow rate of the polyolefin to less than 4 g/10 min, wherein the melt flow rate is measured at 2.16 kg and 190° C. in accordance with ISO 1133, and wherein said start-up phase of step (a) has a duration of 30 minutes to 30 hours, wherein the metallocene is selected from bis(1-methyl-3-butylcyclopentadienyl)zirconium dichloride or bisindenylzirconium dichloride.

10. The process of claim 1, wherein an alkylaluminoxane is used as an activating compound.

11. The process of claim 9, wherein the start-up phase of step (a) has a duration of 2 hours to 20 hours.

12. The process of claim 9, wherein the reaction temperature in step (a) is at least 1° C. higher than the reaction temperature in step (b).

13. The process of claim 12, wherein the reaction temperature in step (a) is 1.5 to 4° C. higher than the reaction temperature in step (b).

14. The process of claim 9, wherein the melt flow rate is regulated by hydrogen concentration in the reactor.

15. The process of claim 9, wherein the melt flow rate is regulated by a monomer partial pressure in the reactor.

16. The process of claim 9, wherein the polyolefin is a homopolymer or copolymer of ethylene.

* * * * *